(12) United States Patent
LaBrec et al.

(10) Patent No.: US 7,927,685 B2
(45) Date of Patent: Apr. 19, 2011

(54) LASER ENGRAVING METHODS AND COMPOSITIONS, AND ARTICLES HAVING LASER ENGRAVING THEREON

(75) Inventors: Brian LaBrec, North Oxford, MA (US); Robert L. Jones, Andover, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 1293 days.

(21) Appl. No.: 10/942,321

(22) Filed: Sep. 14, 2004

(65) Prior Publication Data

US 2005/0095408 A1 May 5, 2005

Related U.S. Application Data

(63) Continuation of application No. 10/326,886, filed on Dec. 20, 2002, now abandoned.

(60) Provisional application No. 60/344,677, filed on Dec. 24, 2001, provisional application No. 60/344,675, filed on Dec. 24, 2001, provisional application No. 60/344,676, filed on Dec. 24, 2001.

(51) Int. Cl.
*B32B 3/00* (2006.01)
*C08K 3/10* (2006.01)
*C08K 3/22* (2006.01)
*G03C 1/00* (2006.01)

(52) U.S. Cl. ......... 428/156; 524/413; 430/945; 430/616

(58) Field of Classification Search ............. 428/156; 283/72; 430/363, 945, 616, 617; 524/413
See application file for complete search history.

(56) References Cited

U.S. PATENT DOCUMENTS

| | | | |
|---|---|---|---|
| 3,758,970 A | 9/1973 | Annenberg | |
| 3,860,558 A | 1/1975 | Klemchuk | |
| 3,975,291 A | 8/1976 | Claussen et al. | |
| 4,032,691 A | 6/1977 | Kido et al. | 428/318.4 |
| 4,035,740 A | 7/1977 | Schafer et al. | |
| 4,072,911 A | 2/1978 | Walther et al. | |
| 4,100,509 A | 7/1978 | Walther et al. | |
| 4,131,337 A | 12/1978 | Moraw et al. | |

(Continued)

FOREIGN PATENT DOCUMENTS

EP 190997 B1 8/1986

(Continued)

OTHER PUBLICATIONS

Canadian Patent application 2,469,938, Office Action dated Jul. 24, 2006, 2 pages.

(Continued)

*Primary Examiner* — Jennifer C McNeil
*Assistant Examiner* — Catherine Simone
(74) *Attorney, Agent, or Firm* — Mintz, Levin, Cohn, Ferris, Glovsky and Popeo, P.C.

(57) ABSTRACT

The invention provides a composition having laser engraving properties, comprising a host material and an effective amount of a laser enhancing additive. The laser enhancing additive comprises a first quantity of least one of copper potassium iodide ($CuKI_3$) or Copper Iodide (CuI), and a second quantity at least one substance selected from the group consisting of zinc sulfide (ZnS), barium sulfide (BaS), alkyl sulfonate, and thioester. The composition can be engraved with grayscale images by an Nd:Yag laser and can be added to laminates or coatings. The composition can be used during the manufacture of many articles of manufacture, including identification documents.

15 Claims, 8 Drawing Sheets

U.S. PATENT DOCUMENTS

| | | |
|---|---|---|
| 4,171,766 A | 10/1979 | Ruell |
| 4,256,900 A | 3/1981 | Raue |
| 4,271,395 A | 6/1981 | Brinkmann et al. |
| 4,274,062 A | 6/1981 | Brinkmann et al. |
| 4,289,957 A | 9/1981 | Neyroud et al. |
| 4,301,091 A | 11/1981 | Schieder et al. |
| 4,317,782 A | 3/1982 | Eckstein et al. |
| 4,326,066 A | 4/1982 | Eckstein et al. |
| 4,338,258 A | 7/1982 | Brinkwerth et al. |
| 4,384,973 A | 5/1983 | Harhnisch |
| 4,467,209 A | 8/1984 | Maurer et al. |
| 4,468,468 A | 8/1984 | Benninghoven et al. |
| 4,507,346 A | 3/1985 | Maurer et al. |
| 4,510,311 A | 4/1985 | Eckstein |
| 4,523,777 A | 6/1985 | Holbein et al. |
| 4,527,059 A | 7/1985 | Benninghoven et al. |
| 4,544,181 A | 10/1985 | Maurer et al. |
| 4,551,265 A | 11/1985 | Brinkwerth et al. |
| 4,579,754 A | 4/1986 | Maurer et al. |
| 4,596,409 A | 6/1986 | Holbein et al. |
| 4,597,592 A | 7/1986 | Maurer et al. |
| 4,597,593 A | 7/1986 | Maurer |
| 4,621,271 A | 11/1986 | Brownstein |
| 4,629,215 A | 12/1986 | Maurer et al. |
| 4,653,775 A | 3/1987 | Rapheal et al. |
| 4,654,290 A | 3/1987 | Spanjer |
| 4,663,518 A | 5/1987 | Borror er al. |
| 4,670,882 A | 6/1987 | Telle et al. |
| 4,672,891 A | 6/1987 | Maurer et al. |
| 4,687,526 A | 8/1987 | Wilfert |
| 4,732,410 A | 3/1988 | Holbein et al. |
| 4,735,670 A | 4/1988 | Maurer et al. |
| 4,738,949 A | 4/1988 | Sethi et al. |
| 4,748,452 A | 5/1988 | Maurer |
| 4,751,525 A | 6/1988 | Robinson |
| 4,765,656 A | 8/1988 | Becker et al. |
| 4,766,026 A | 8/1988 | Lass et al. |
| 4,803,114 A | 2/1989 | Schledorn |
| 4,816,372 A | 3/1989 | Schenk et al. |
| 4,816,374 A | 3/1989 | Lecomte |
| 4,822,973 A | 4/1989 | Fahner et al. |
| 4,894,110 A | 1/1990 | Lass et al. |
| 4,959,406 A | 9/1990 | Foltin et al. |
| 4,999,065 A | 3/1991 | Wilfter |
| 5,005,872 A | 4/1991 | Lass et al. |
| 5,024,989 A | 6/1991 | Chiang et al. |
| 5,061,341 A | 10/1991 | Kildal et al. |
| 5,075,195 A * | 12/1991 | Babler et al. ............. 430/200 |
| 5,100,711 A | 3/1992 | Satake et al. |
| 5,122,813 A | 6/1992 | Lass et al. |
| 5,138,070 A | 8/1992 | Berneth |
| 5,156,938 A | 10/1992 | Foley et al. |
| 5,215,864 A | 6/1993 | Laakmann |
| 5,259,311 A | 11/1993 | McCaughey, Jr. |
| 5,261,987 A | 11/1993 | Luening et al. |
| 5,294,774 A | 3/1994 | Stone |
| 5,298,922 A | 3/1994 | Merkle et al. |
| 5,304,789 A | 4/1994 | Lob et al. ................ 235/487 |
| 5,374,675 A * | 12/1994 | Plachetta et al. ............. 524/403 |
| 5,421,619 A | 6/1995 | Dyball |
| 5,489,639 A | 2/1996 | Faber et al. |
| 5,509,693 A | 4/1996 | Kohls |
| 5,523,125 A | 6/1996 | Kennedy et al. |
| 5,529,345 A | 6/1996 | Kohls |
| 5,576,377 A | 11/1996 | El Sayed et al. |
| 5,633,119 A | 5/1997 | Burberry et al. |
| 5,671,005 A | 9/1997 | McNay et al. |
| 5,717,018 A | 2/1998 | Magerstedt et al. |
| 5,719,667 A | 2/1998 | Miers |
| 5,745,308 A | 4/1998 | Spangenberg |
| 5,768,001 A | 6/1998 | Kelley et al. |
| 5,769,301 A | 6/1998 | Hebert et al. |
| 5,801,857 A | 9/1998 | Heckenkamp et al. ............ 359/2 |
| 5,816,619 A | 10/1998 | Schaede |
| 5,824,715 A | 10/1998 | Hayashihara et al. |
| 5,840,142 A * | 11/1998 | Stevenson et al. ............. 156/237 |
| 5,840,791 A | 11/1998 | Magerstedt et al. |
| 5,841,886 A | 11/1998 | Rhoads |
| 5,844,685 A | 12/1998 | Gontin |
| 5,853,955 A | 12/1998 | Towfiq |
| 5,855,969 A | 1/1999 | Robertson |
| 5,866,644 A | 2/1999 | Mercx et al. |
| 5,867,199 A | 2/1999 | Knox et al. |
| 5,872,627 A | 2/1999 | Miers |
| 5,895,074 A | 4/1999 | Chess et al. |
| 5,897,938 A * | 4/1999 | Shinmoto et al. ............. 428/354 |
| 5,936,986 A | 8/1999 | Cantatore et al. |
| 5,944,356 A | 8/1999 | Bergmann et al. |
| 5,965,242 A | 10/1999 | Patton et al. |
| 5,973,842 A | 10/1999 | Spangenberg |
| 5,975,583 A | 11/1999 | Cobben et al. |
| 5,977,514 A | 11/1999 | Feng et al. |
| 6,007,929 A | 12/1999 | Robertson et al. |
| 6,017,972 A | 1/2000 | Harris et al. |
| 6,022,905 A | 2/2000 | Harris et al. |
| 6,028,134 A | 2/2000 | Zhang et al. |
| 6,036,807 A | 3/2000 | Brongers |
| 6,037,102 A | 3/2000 | Loerzer et al. |
| 6,054,170 A | 4/2000 | Chess et al. |
| 6,066,594 A | 5/2000 | Gunn et al. |
| 6,075,223 A | 6/2000 | Harrison |
| 6,086,971 A | 7/2000 | Haas et al. |
| 6,110,864 A | 8/2000 | Lu |
| 6,122,403 A | 9/2000 | Rhoads |
| 6,127,475 A | 10/2000 | Vollenberg et al. |
| 6,143,852 A | 11/2000 | Harrison et al. |
| 6,179,338 B1 | 1/2001 | Bergmann et al. |
| 6,207,344 B1 | 3/2001 | Ramlow et al. |
| 6,214,916 B1 | 4/2001 | Mercx et al. |
| 6,214,917 B1 | 4/2001 | Linzmeir et al. |
| 6,221,552 B1 | 4/2001 | Street et al. |
| 6,238,840 B1 | 5/2001 | Hirayama et al. |
| 6,238,847 B1 | 5/2001 | Axtell, III et al. |
| 6,242,249 B1 | 6/2001 | Burnham et al. |
| 6,291,551 B1 | 9/2001 | Kneiss et al. |
| 6,302,444 B1 | 10/2001 | Cobben |
| 6,313,436 B1 | 11/2001 | Harrison |
| 6,326,128 B1 | 12/2001 | Telser et al. |
| 6,372,394 B1 | 4/2002 | Zientek |
| 6,400,386 B1 | 6/2002 | No et al. |
| 6,444,068 B1 | 9/2002 | Koops et al. |
| 6,475,588 B1 | 11/2002 | Schottland et al. |
| 6,614,914 B1 | 9/2003 | Rhoads et al. |
| 6,752,432 B1 | 6/2004 | Richardson |
| 6,794,115 B2 | 9/2004 | Telser et al. |
| 2002/0146549 A1 | 10/2002 | Kranenburg-Van Dijk et al. |
| 2002/0170966 A1 | 11/2002 | Hannigan et al. |
| 2003/0031340 A1 | 2/2003 | Alattar et al. |
| 2004/0198858 A1 | 10/2004 | Labrec |
| 2005/0003297 A1 | 1/2005 | Labrec |

FOREIGN PATENT DOCUMENTS

| | | |
|---|---|---|
| GB | 2227570 A | 8/1990 |
| WO | WO97/01446 | 1/1997 |
| WO | WO 00/43214 | 7/2000 |
| WO | WO 00/78554 | 12/2000 |
| WO | WO 01/00719 | 1/2001 |
| WO | WO 01/45559 | 6/2001 |
| WO | WO 02/42371 | 5/2002 |
| WO | WO03/055684 | 7/2003 |

OTHER PUBLICATIONS

Canadian Patent application 2,469,938, claims as filed, with effective filing date of Dec. 20, 2002, 10 pages.

Clariant Masterbatches Division Price Quotation # 474938, Nov. 30, 2000, 2 pages.

Clariant Masterbatches, pricing, # 762998, 2 pages, 2004.

Datacard DCL30, "The Most Secure Card Personalization System for ID Programs," 2002, 3 pages.

effekte, "Plastics on the Rise," Mar. 2001, 12 pages.

EM Industries Inc., Lazer Flair LS Series Pigments, Dec. 11, 2002 3 pages.

Graff, "Laser Marking Makes Bigger Imprint in Plastics," Aug. 11, 2004, 7 pages.

Hill, "Cure of Thermoset Industrial Coatings," Proc. 2d Pacific Coatings forum, Nov. 1-3, 1997, 6 pages.

Plastics Technology, "Laser Marking Has a Bright Future in Plastics," http://www.plasticstechnology.com/articles/200108fa1.html, Aug. 2001, 5 pages.

Santroprene, "Add Value to Your TPEs with Special Effects," not added, 12 pages.

* cited by examiner

LASER ENGRAVING METHODS AND COMPOSITIONS, AND ARTICLES HAVING LASER ENGRAVING THEREON

RELATED APPLICATION DATA

The present application is a continuation of U.S. patent application Ser. No. 10/326,886, filed Dec. 20, 2002 (Publication No. 2003-0234286), now abandoned, which claims priority to the following United States Provisional Applications:

Sensitizing Materials for Laser Engraving (Application No. 60/344,677—Inventor Brian Labrec), filed Dec. 24, 2001;

Laser Engraving Coating System (Application No. 60/344,675—Inventor Brian Labrec), filed Dec. 24, 2001; and Forming Variable Information In Identification Documents By Laser Ablation (Application No. 60/344,676 filed Dec. 24, 2001—Inventor: Brian LaBrec).

The above listed applications are incorporated herein by reference in their entirety.

U.S. patent application Ser. No. 10/326,886 is related to U.S. patent application Ser. No. 09/747,735, now U.S. Pat. No. 6,923,378, filed Dec. 22, 2000, Ser. No. 09/602,313, now U.S. Pat. No. 6,752,432, filed Jun. 23, 2000, and Ser. No. 10/094,593, filed Mar. 6, 2002, now abandoned, U.S. Provisional Patent Application No. 60/358,321, filed Feb. 19, 2002, as well as U.S. Pat. No. 6,066,594. Each of the above U.S. patent documents is herein incorporated by reference.

TECHNICAL FIELD

The invention generally relates to methods and compositions for laser marking or engraving that contain one or more laser enhancing additives, as well as methods for conveying information, images, and security features on data carriers through laser engraving and marking, including laser engraving and marking using such compositions.

BACKGROUND

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an ATM, debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

In the production of images useful in the field of identification documentation, it is oftentimes desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. These signals are then utilized to print an image onto a data carrier. For example, information can be printed using a printer having a plurality of small heating elements (e.g., pins) for imagewise heating of each of a series of donor sheets (respectively, carrying sublimable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents. Another security advantage with centrally issued documents is that the security features and/or secured materials used to make those features are centrally located, reducing the chances of loss or theft (as compared to having secured materials dispersed over a wide number of "on the spot" locations).

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized polyvinyl chloride (PVC) or have a composite structure with polyester laminated to 0.5-2.0 mil (13-51 .mu.m) PVC film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the print head, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the print head. The choice of laminate dictates the degree of durability and security imparted to the system in protecting the image and other data.

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (such as, for example, white PVC material) that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26a-c is printed on the card blank 25 using a method such as Dye Diffusion Thermal Transfer ("D2T2") printing (described further in commonly assigned U.S. Pat. No. 6,066,594, which is incorporated hereto by reference in its entirety.) The information 26a-c can, for example, comprise an indicium or indicia, such as the invariant or nonvarying information common to a large number of identification documents, for example the name and logo of the organization issuing the documents. The information 26a-c may be formed by any known process capable of forming the indicium on the specific core material used.

To protect the information 26a-c that is printed, an additional layer of overlaminate 24 can be coupled to the card blank 25 and printing 26a-c using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, and engraving many different types of materials, including plastics. Lasers have been used, for example, to mark plastic materials to create indicia such as bar codes, date codes, part numbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat which causes a visible discoloration in the thermoplastic. The visible discoloration serves as a "mark" or indicator; it will be appreciated that laser beams can be controlled to form patterns of "marks" that can form images, lines, numbers, letters, patterns, and the like. Depending on the type of laser and the type of material used, various types of marks (e.g., dark marks on light backgrounds, light marks on dark backgrounds, colored marks) can be produced. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6,179,338 describe various implementations for using a laser to print information, and these patents are incorporated herein in their entirety.

SUMMARY OF THE INVENTION

Using laser beams to write or engrave information to ID cards presents a number of advantages over conventional printing. For example, the foaming of the thermoplastic that can occur with some types of laser engraving can be adapted to provide an indicium having a tactile feel, which is a useful authenticator of a data carrier that also can be very difficult to counterfeit or alter. In addition, laser engraving generally does not require the use of ink, which can reduce the cost of consumables used to manufacture an ID card. Laser engraving can also be more durable than ink printing, and more resistant to abrasion (which can be particularly useful if a counterfeiter attempts to "rub off" an indicium on an ID card). The resolution and print quality of laser engraving often can be higher than that of conventional ink-based printing. Laser engraving also can be a more environmentally friendly manufacturing process than printing with ink, especially because solvents and other chemicals often used with ink generally are not used with laser engraving.

Despite the advantages of laser engraving, certain limitations still exist. Even when using known laser-enhancing additives, laser marking of some types of materials does not produce an adequate contrast for all applications. Some types of materials, such as silica filled polyolefin, TESLIN core ID documents and TESLIN composite structures (TESLIN is available from PPG Industries, Inc., Pittsburgh, Pa.) using conventional over-laminate materials, are not easily laser engraved. Further, even with use of known laser additives, laser engraving can take too much time and/or too much laser energy to be useful in some manufacturing environments.

The inventor of the instant application has found that laser engraving of some types of materials, including materials that are not easily engraved (such as laminated TESLIN core ID documents), can be improved by increasing the sensitivity to laser radiation of a laminate used with the material and/or increasing the sensitivity to laser radiation of a coating applied to the material.

One inventive technique disclosed herein improves the material being laser marked or laser engraved by introducing inventive laser enhancing additives to the material. The material can be a laminate, a coating, or an article having a laminate or coating formed thereon. These additives facilitate material sensitivity, greatly improving the ability to laser engrave laminated ID documents. In some embodiments, these additives can also improve the performance of laser engraving even on even those structures (e.g., fused polycarbonate card structures, polyvinylchloride (PVC), polyethylene terephthalate (PET), and acrylonitrile butadiene styrene (ABS)) that can tend to be more easily engraved by laser energy.

The inventor has have found that by using the inventive additives described herein, the processing time for polycarbonate ID card structures may be decreased. In addition, user of the laser enhancing additives described herein may enable laser engraving to be accomplished using less laser energy and/or lower levels of laser energy than in known methods. Another inventive technique disclosed herein improves the sensitivity of a material being laser engraved by applying a coating to the material, the coating containing at least one laser enhancing additive as described below. The material can be part of virtually any type of article to be laser marked or laser engraved. For example, in one embodiment the material is a core layer in an identification document.

In one embodiment, the additive used to enhance laser engraving comprises a mixture of either copper potassium iodide ($CuKI_3$) or Copper Iodide (CuI) with at least one substance selected from the group consisting of zinc sulfide (ZnS), barium sulfide (BaS), alkyl sulfonate (e.g., $RSO_2Na$ or $R—OSO_2Na$), and Thioester (e.g., substances containing —SH). This additive can be added to a laminate layer (where the laminate layer itself is to be laser engraved or marked) and/or to a coating (where the surface being coated is to be laser engraved or marked).

Advantageously, in one embodiment, the additive comprises an effective amount of copper potassium iodide and zinc sulfide in a host material. The host material can, for example, be a laminate or a coating. The host material also can be another material that is later added to a laminate or coating. The host material can, for example, be a thermoplastic or thermoset.

For laminates, the host material (as well as the laminate to which the host material may be added) generally can be any material whose laser engraving/marking properties are improved by the addition of the laser enhancing additive described herein, and it is expected that many materials developed in the future will be able to make use of the additive described herein. In at least one embodiment, the addition of the laser enhancing additive described herein enables the laminate to be laser engraved with a grayscale image.

For coatings, in one embodiment, the additive comprises an effective amount of copper potassium iodide and zinc sulfide in a liquid carrier material, which together form a coating that can be applied to an article to be laser engraved. The liquid carrier material can be virtually any known material that can be used as a coating, including resins, polyesters, polycarbonates, vinyls, acrylates, urethanes, and cellulose-base coating. In one embodiment, the liquid carrier material is a material used for coating a surface of a core material (e.g., TESLIN, polycarbonate) of an identification document. The surface being coated generally can be any material (including laminates) whose laser engraving properties are improved by the addition of a coating containing the laser enhancing additive described herein. In at least one embodiment, the addition of the inventive additive to a coating enables the surface to be capable of being engraved with a grayscale image.

For transparent laminates and/or coatings, the effective amount of the laser enhancing additive can vary depending on the tolerance for possible reduction in the transparency of the laminate or coating. In one embodiment, for transparent laminates or coating, the effective amount of the additive can range from 0.001% by weight up to about 0.1% by weight (based on the total weight of the material to which the additive is added.).

For non-transparent laminates and/or coatings (e.g. colored coatings, colored laminates and/or opaque laminates), the effective amount of the additive can be higher than 1% (e.g., 1%-100%). Those skilled in the art will recognize that the effective amount of the additive for a given use can depend on a number of factors, including the properties of the laminate or coating, the type of laser engraving being performed (e.g., grayscale or non-grayscale), the type of laser used, the desired properties or features of the article or surface being engraved, etc. Advantageously, for at least some transparent laminates and/or coatings used in forming identification documents, the effective amount of the additive is about 0.06% by weight.

In another advantageous embodiment, the constituents of the above-described additive can be present in two different layers through which a laser beam can pass. In one example, the copper potassium iodide can be present in a first layer of laminate and the zinc sulfide can be present in a second layer of laminate, where the first and second layers are either adjacent or separated by one or more layers of material (e.g., another laminate or an adhesive) that is transparent to laser radiation. When a laser beam is directed such that it passes through both of the layers, the combined action of the copper potassium iodide and zinc sulfide enable laser engraving to occur in either or both of the layers. In another example, an effective amount of copper potassium iodide can be present in a coating applied to an article and an effective amount of zinc sulfide can be present in a laminate applied over the coating.

In another aspect, the invention provides a composition having laser engraving properties, comprising a host material and an effective amount of a laser enhancing additive. The laser enhancing additive comprises a first quantity of least one of copper potassium iodide ($CuKI_3$) or Copper Iodide (CuI), and a second quantity of at least one substance selected from the group consisting of zinc sulfide (ZnS), barium sulfide (BaS), alkyl sulfonate, and thioester. In one embodiment, the first and second quantities are the same (for example, one part copper iodide and one part barium sulfide). In one embodiment, the first and second quantities are different (for example, three parts copper potassium iodide to one part zinc sulfide, or 2 parts copper iodide to 4 parts thioester). In one embodiment, the composition is markable by at least one of an excimer, Nd:YAG, and $CO_2$ laser (including both light pumped and diode pumped Nd:YAG lasers).

In one embodiment, the laser enhancing additive is present in the composition in an amount from about 0.001 to 0.100 percent by weight based on the total weight of the composition. In one embodiment, the laser enhancing additive is present in an amount between 0.1 percent and 100 percent by weight based on the total weight of the composition. In one embodiment, the laser enhancing additive is present in an amount that is about 0.06 percent by weight based on the total weight of the composition. In one embodiment, the laser enhancing additive comprises 0.03 percent by weight of at least one of copper potassium iodide ($CuKI_3$) or Copper Iodide (CuI) and 0.03 percent by weight of at least one of zinc sulfide (ZnS), barium sulfide (BaS), alkyl sulfonate, and thioester, each weight based on the total weight of the composition.

In one embodiment, the host material of the composition is be a material that is not sensitive and/or transparent to laser radiation, such as a material that, by itself, is unable to have acceptable gray scale images laser engraved onto it. The host material can be a laminate or a coating. For example, the host material can comprise at least one of a thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone, and combinations thereof.

In at least one embodiment, the invention provides an article of manufacture (such as an identification document) capable of being laser engraved with a grayscale image, comprising a core layer, a first layer and a second layer. The core layer has a first surface. The first layer comprises a first host material, the first host material comprising an effective amount of a first laser enhancing additive comprising at least one of one of copper potassium iodide ($CuKI_3$) or Copper Iodide (CuI). The second layer comprises a second host material and is oriented in relation to the first host material such that a single laser beam can penetrate both at least a portion of the first layer and at least a portion of the second layer. The second host material comprises an effective amount of a second laser enhancing additive selected from the group consisting of zinc sulfide (ZnS), barium sulfide (BaS), alkyl sulfonate, and thioester. The first and second layers are operably coupled to each other and at least one of the first and second layers is operably coupled to the first surface of the core layer. In one embodiment, a grayscale image is laser engraved into at least one of the first and second layers.

In one embodiment, first layer is substantially transparent and the first laser enhancing additive is present in an amount from about 0.001 to 0.100 percent by weight based on the total weight of the first host material. In one embodiment, the second layer is substantially transparent, and the second laser enhancing additive is present in an amount from about 0.001 to 0.100 percent by weight based on the total weight of the second host material. In one embodiment, a third layer is disposed between the first and second layers; the third layer comprises a material that permits transmission of a laser beam therethrough.

In another aspect, the invention provides a method of engraving a material by exposing the material to laser radiation. An effective amount of a laser enhancing additive is added to the material. The laser enhancing additive comprises at least one of copper potassium iodide ($CuKI_3$) or Copper Iodide (CuI), and at least one substance selected from the group consisting of zinc sulfide (ZnS), barium sulfide (BaS), alkyl sulfonate, and thioester. The material is exposed to laser radiation in a manner that causes the material to be engraved by the laser radiation. In one embodiment, the effective amount of the laser enhancing additive comprises 0.01% to 0.1% by weight of the material, e.g. 0.06% by weight. In one embodiment, the effective amount of the laser enhancing additive comprises 0.1% to 100% by weight of the material. In one embodiment, an indicium is formed in grayscale in at least a portion of the material through the exposure of the portion of the material to laser radiation. In one embodiment, the laser engraved material is used in the manufacture of an identification document.

In another embodiment, the invention provides a method of laser engraving a grayscale image on an article having first and second layers. A first effective amount of at least one of copper potassium iodide ($CuKI_3$) or Copper Iodide (CuI) is added to the first layer. A second effective amount of at least one substance selected from the group consisting of zinc sulfide (ZnS), barium sulfide (BaS), alkyl sulfonate, and thioester is added to the second layer. A laser beam, such as a beam from at least one of an Nd:Yag laser and a $CO_2$ laser, is directed so that it passes through at least a portion of the first layer and at least a portion of the second layer to form a grayscale image in at least one of the first and second layers. In one embodiment, the laser beam is directed so that it that it passes through at least a portion of the first layer and at least a portion of the second layer such that the first and second layers become affixed to each other.

In at least one embodiment, the invention provides a multilayer identification document, comprising a core layer and a film layer. The film layer overlays at least a portion of the core layer and is affixed to the portion of the core layer. The film layer comprising an additive that comprises an effective amount of least one of copper potassium iodide ($CuKI_3$) or Copper Iodide (CuI), and an effective amount of at least one substance selected from the group consisting of zinc sulfide (ZnS), barium sulfide (BaS), alkyl sulfonate, and thioester. In one embodiment, the identification document bears a first indicium thereon, the indicia obtained by exposing the film layer to a laser beam. In one embodiment, the indicia comprises at least one of a gray scale image, photograph, text, tactile text, graphics, information, security pattern, security indicia, and a digital watermark.

In another aspect, the invention provides an identification document having improved laser engraving characteristics. The identification document comprises a TESLIN core coated with a coating containing the laser enhancing additive described above. A grayscale image representing variable data (e.g., personalized data) is laser engraved onto the TESLIN core using an Nd:YAG laser. Optionally, a laminate can be affixed to the TESLIN either before laser engraving or after laser engraving. If the laminate is applied before the TESLIN core is laser engraved, the laminate generally will be transparent to laser radiation.

Although some companies offer laser engraving document materials, such materials can be prohibitively expensive. At least some embodiments of our invention can overcome at least some of these and other limitations of the prior art. At least some embodiments of our invention offer a less expensive option for laser engraving with improved grayscale engraving, and ease of manufacture, without giving up desired security features.

The foregoing and other features and advantages of the present invention will be even more readily apparent from the following Detailed Description, which proceeds with reference to the accompanying drawings.

BRIEF DESCRIPTION OF THE DRAWINGS

The advantages, features, and aspects of embodiments of the invention will be more fully understood in conjunction with the following detailed description and accompanying drawings, wherein.

Figure 1:
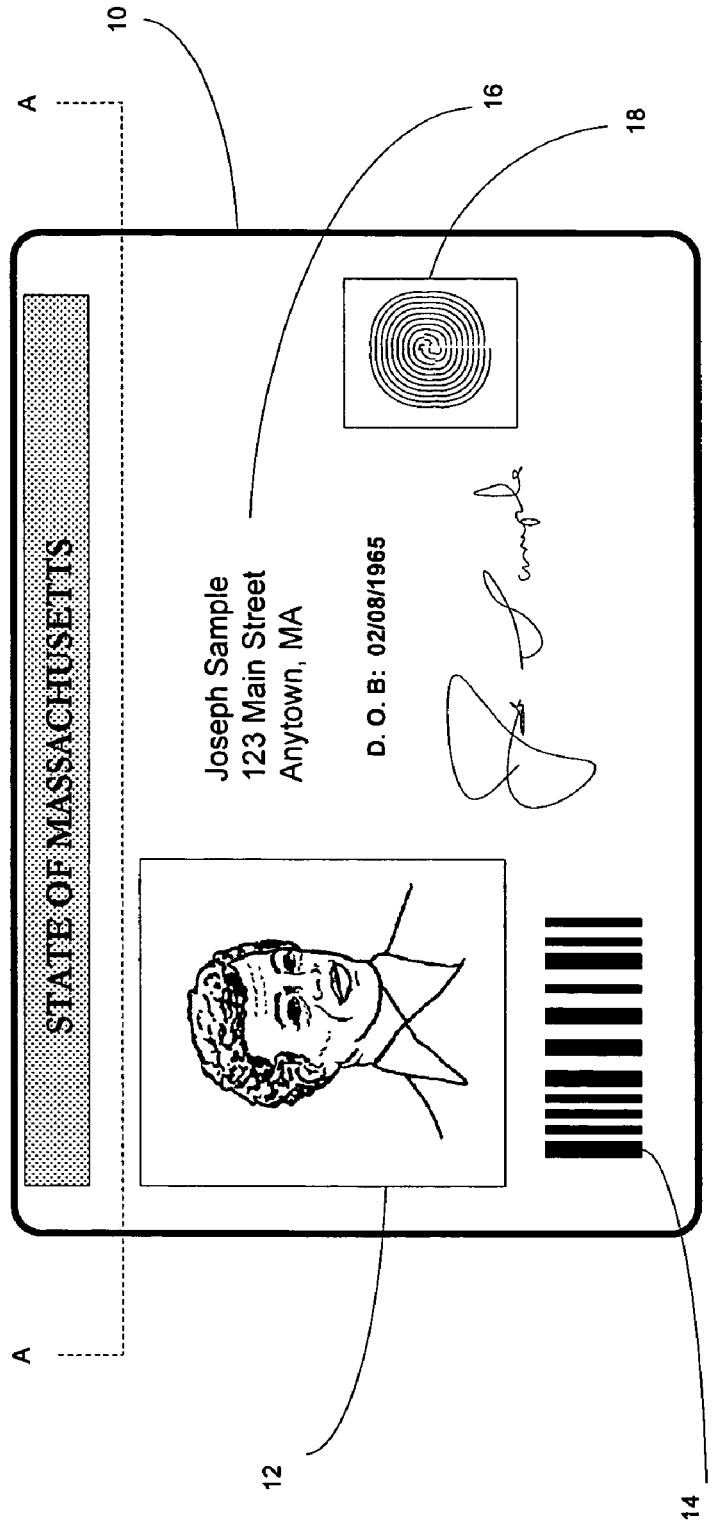
FIG. 1 is an illustrative example of a prior art identification document.

The drawings are not necessarily to scale, emphasis instead generally being placed upon illustrating the principles of the invention. In addition, in the figures, like numbers refer to like elements. Further, throughout this application, laser engraved indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during laser engraving or manufacturing of identification documents.

DETAILED DESCRIPTION

A. Introduction and Definitions

In the foregoing discussion, the use of the word "ID document" is broadly defined and intended to include at least all types of ID documents, including (but are not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.

Note that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including engraving of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are printed at the time of card personalization. Personalized data can, for example, be "personal to" or "specific to" a specific cardholder or group of cardholders. Personalized data can include data that is unique to a specific cardholder (such as biometric information, image information), but is not limited to unique data. Personalized data can include some data, such as birthdate, height, weight, eye color, address, etc., that are personal to a specific cardholder but not necessarily unique to that cardholder (i.e., other cardholders might share the same personal data, such as birthdate). Depending on the application, however, personalized data can also include some types of data that are not different from card to card, but that are still provided at the time of card personalization. For example, a state seal that is laser engraved onto a portion of an overlaminate in an identification document, where the laser engraving occurs during the personalization of the card, could in some instances be considered to be "personalized" information.

The terms "laser engraving" and "laser marking" are used interchangeably herein.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are wellknown to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to improve their laser engraving characteristics. Generally, the invention has applicability for virtually any product which is to be laser engraved, especially products being engraved with grayscale images. For example, in at least some embodiments, the invention is usable with virtually any product which is to be laser engraved or marked, especially articles to which a laminate and/or coating is applied, including articles formed from paper, wood, cardboard, paperboard, glass, metal, plastic, fabric, ceramic, rubber, along with many manmade materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, at least one embodiment of the invention relates to virtually any article formed from, laminated with, or at least partially covered by a material that not sufficiently responsive to laser radiation to form a desired indicium (e.g., a grayscale image) thereon, but which is rendered more responsive to laser radiation, at least to a sufficient degree to enable its surface to be marked as desired with a laser beam, by adding the inventive laser enhancing additive to the material itself or to another material (e.g., a coating or laminate) that is substantially adjacent to the material.

B. Laser Engraving

It is often desirable to mark a portion of a structure, such as a multi-layered structure (including after lamination), such as an ID document, with text, information, graphics, logos, security indicia, security features, marks, images and/or photographs. It would be advantageous if techniques were available to enable laser engraving to produce some or all of these features, especially gray scale and/or color images and photographs.

In some instances, however, some parts of a multi-layered ID document structure, (for example, a structure that includes polyester or polycarbonate laminate on a core such as TESLIN) can be non-conducive to acceptable engraving of specific types of information. For example, some materials can be laser engraved (using, for example, a $CO_2$ laser) with text information (e.g., dark on light), but cannot be satisfactorily laser engraved with usable grayscale information (e.g., grayscale information conveying up to 256 shades of gray), such as images or photographs, or full color information.

Other materials are difficult to laser engrave even with text information. For example, some materials, such as silica filled polyolefin, TESLIN, polycarbonate and fused polycarbonate, polyethylene, polypropylene (PPRO), polystyrene, polyolefin, and copolymers are not very sensitive to laser radiation and thus are not especially conducive to laser engraving. Attempts to laser engrave structures that include such non-sensitive and non-conducive materials can sometimes result in engraving that appears too faint to be usable to convey information visually (although the engraving might be useful to provide a tactile feel to the structure). Such a multi-layered structure lacks the sensitivity required for favorable laser engraving. The ability to provide gray scale images on an identification document using a laser, in accordance with the invention, can be advantageous because it can provide increased security of the identification document. In addition, it may be possible to use the invention incorporate additional security features (such as digital watermarks) into the laser engraved grayscale image.

C. First Aspect of the Invention
C.1 Features

In a first aspect, one embodiment of the invention involves sensitizing at least one of the layers in a multi-layered structure, such as at least one laminate layer, to help to overcome the problem of the laminate material not being responsive to laser engraving and/or not being responsive enough to be capable of having grayscale images laser engraved thereon. We have found that the quality of laser engraving can be improved, while reducing engraving time, through over-laminate sensitization using one or more of the inventive formulations described herein. In one implementation of this embodiment, a layer of laminate is modified by adding an effective amount of one or more laser sensitive additives to the laminate material. We also have found that the laser sensitive additives described herein can be divided over two or more layers to provide improved laser engraving performance. Moreover (as described later herein in the second and third aspects of the invention), we have found that the laser sensitive additives also will improve laser engraving if they are present in a coating applied to a material to be engraved.

A least one embodiment of the first aspect of the invention is based on the surprising discovery that the process of laser engraving of materials such as laminates is improved and enhanced by adding to the laminate a first effective amount of a first composition, the first composition being at least one of copper potassium iodide ($CuKI_3$) or copper iodide (CuI) together with a second effective amount of a second composition, the second composition being at least one of the following: zinc sulfide (ZnS), barium sulfide (BaS), alkyl sulfonate (e.g., $RSO_2Na$ or $R$—$OSO_2Na$), and Thioester (e.g., substances containing —SH). The combination of CuI or $CuKI_3$ together with at least one of ZnS, BaS, alkyl sulfonate, and thioester will hereinafter be referred to as the "inventive laser enhancing additive". The components of the inventive laser enhancing additive, namely the component comprising at least one of copper potassium iodide ($CuKI_3$) or copper iodide (CuI) and the component comprising at least one of zinc sulfide (ZnS), barium sulfide (BaS), alkyl sulfonate (e.g., $RSO_2Na$ or $R$—$OSO_2Na$), and Thioester, will sometimes be referred to as the "inventive laser enhancing additives").

As those skilled in the art will appreciate, the effective amounts of the first and second compositions can vary depending on the material to which the inventive laser enhancing additive is added and on the laser engraving technique being employed. In at least one embodiment, the inventive laser enhancing additive includes equivalent amounts of the first and second compositions. In at least one embodiment, the inventive laser enhancing additive includes more of the second composition than the first composition. In at least one embodiment, the inventive laser enhancing additive includes more of the first composition than the second composition.

The exact nature of the mechanism by which the inventive laser enhancing additive works is not yet established. It is possible that the inventive laser enhancing additive increases the molecular activity within the laminate when the heat from the laser is applied, enabling the laminate to respond faster and/or more intensely to the laser energy. It also is possible that the additive increases the opacity of the laminate, enabling it to better respond to laser energy. It also is possible that the components of the inventive laser enhancing additive react with each other and/or with the host material to form black species within the host material.

Using the inventive laser enhancing additive, high quality images and other engravings can be formed on articles such as multi-layered ID documents at acceptable throughput rates by modifying the materials being engraved by adding the inventive laser enhancing additives to the material (or by coating the material with a coating containing the inventive laser enhancing additive, as discussed further in the second aspect of the invention). The inventive laser enhancing additive can not only make a material that is non-sensitive to laser radiation more sensitive to laser radiation, but also can reduce the laser engraving time as well. In addition, because the inventive laser enhancing additive can improve the responsiveness of the material being laser engraved to laser energy, high definition images, such as gray scale images (which can be used on identification documents), can be created with the laser engraving process.

In at least one embodiment, use of any of the above laser enhancement formulations improves the quality of the laser engraving by increasing the contrast, (including at least dark colors on light backgrounds) that can occur when using a laser having a given power level. In at least some embodiments, the increased contrast resulting from use of one of the above-described laser enhancing additives may enable the laser engraving to be accomplished using a lower-power laser than would need to be used without user of the laser enhancing additive. It at least some embodiments, the increased sensitivity resulting from use of one of the above-described laser enhancing additives may reduce the time necessary to accomplish the laser engraving.

In accordance with at least some embodiments of the first aspect of the invention, any of the above-described inventive laser enhancing additives can be added to virtually any material (including all known thermoplastics and thermosets) to enhance the process of laser marking and/or laser engraving of either the material to which the inventive laser enhancing additive is added or any material disposed substantially adjacent thereto. Advantageously, the addition of the inventive laser enhancing additive enables whatever material(s) it has been added to be laser engraved with a grayscale image.

In accordance with another embodiment of the first aspect of the invention, a first part of the inventive laser enhancing additive (i.e., a part that contains an effective amount of CuI or $CuKI_3$) can be added to a first layer of laminate and a second part of the inventive laser enhancing additive (i.e., part that contains an effective amount at least one of ZnS, BaS, alkyl sulfonate, and thioester) can be added to a second layer of laminate, wherein a single laser beam passes through both layers and enables the laser engraving of either or both layers. In accordance with still another embodiment of the first aspect invention, the inventive laser enhancing additive can be added to a core material that is laminated with a material that is transparent to laser radiation, wherein the core material also can be laser engraved.

In at least one advantageous embodiment, the inventive laser enhancing additive is added to core, laminate and/or over laminate materials used in the manufacture of identification documents, to improve the process of laser engraving or marking of the identification documents and to enable laser engraving of a grayscale image on the identification documents.

Note that the laser enhancing additives in accordance with the invention are usable for both materials that usually are not sensitive to laser radiation as well as materials that are already sensitive to laser radiation. The inventive laser enhancing additive can be present in a material, such as a laminate, at the same time that other compositions (e.g., other laser enhancing or absorbing additives, reinforcing fillers, antioxidants, flame retardants, stabilizers, plasticizers, lubricants, dispersants, and the like) are present in the same material and/or a separate layer of material.

Illustrative examples of laminate materials to which the inventive laser enhancing additive may be added include (but are not limited to) polyester, polycarbonate (PC), fused polycarbonate, polyvinyl chloride (PVC), polyethylene, thermosets, thermoplastic and thermoplastic resins (including those that foam when heated), engineering thermoplastics (ETP), polyurethane, polyamides, expanded polypropylene (EPP), polypropylene, acrylonitrile butadiene styrene (ABS), ABS/PC and ABS/PC products, high impact polystyrene (HIPS), polyethylene terephthalate (PET), PET-G, PET-F, polybutylene terephthalate (PBS), acetal copolymer (POM), and polyetherimide (PEI), polymer, copolymer, polyester, amorphous polyester, polyolefin, silicon-filled polyolefin, TESLIN, foamed polypropylene film, polystyrene, polyacrylate, poly (4-vinylpyridine, poly(vinyl acetate), polyacrylonitrile, polymeric liquid crystal resin, polysulfone, polyether nitride, and polycaprolactone, as well as virtually any known plastic or polymer. Of course, it will be appreciated that embodiments of the invention have applicability for the laser engraving and/or marking of plastic materials used to make many different articles formed by virtually any known method, including molding and extruding.

In at least some embodiments, the resultant concentration of the inventive laser enhancing additive in the laminate, by weight, ranges from 0.001% to 0.1% by weight. In at least some embodiments, the inventive laser enhancing additive is added at larger concentrations (e.g., from 0.1% to 100%). At concentrations larger than 0.1%, the inventive laser enhancing additive can still be used to enhance laser marking or engraving, but at possible sacrifice of some of the transparency of the laminating material (if, in fact, the laminating material is substantially transparent or translucent to begin with).

Advantageously, in at least one embodiment, the laser enhancing additive is about 0.06% by weight in the laminate. In another advantageous embodiment, the 0.06% by weight includes 0.03% by weight of at least one of CuI or $CuKI_3$ and 0.03% by weight of at least one of ZnS, BaS, alkyl sulfonate, and thioester. Of course, those skilled in the art will appreciate that other concentration ranges for the laser enhancing formulations may be usable, especially when using opaque materials and colored materials. In addition, it will be appreciated that the proportions of the at least one of CuI or $CuKI_3$ and of the at least one of ZnS, BaS, alkyl sulfonate, and thioester also can vary.

The concentration of the inventive laser enhancing additive that is usable with a given laminate is at least in part dependent on the properties of the laminate and the ultimate use, durability, environmental conditions, etc., to which the laminate is subject. It is possible that higher concentrations of the laser enhancing formulations in the laminate may affect one or more properties of the laminate, such as transparency, durability, malleability, opacity, rigidity, etc. Of course, appropriate quantities of the additives can be determined for a particular over-laminate application without undue experimentation. Additional factors may include engraving time and process, base over-laminate material or composition, and desired engraving quality.

It is contemplated that the inventive laser enhancing additive can be added to a laminate that is affixed (e.g., by adhesive, lamination, chemical reaction, etc.) to virtually any product, to enable the laminate to be laser engraved, especially with a grayscale image, thereby producing (especially if the laminate is substantially transparent or translucent) a laser engraving or marking on the laminate affixed to the article. Accordingly, we believe that the inventive laser enhancing laminate has applicability to the manufacture many different articles that can be laminated, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a material that contains the inventive laser enhancing additive and then laser engraved or marked.

C.2 Preparation/Manufacture

The inventive laser enhancing additive can be added to the laminate in many different ways. The following technique describes the preparation and addition of the inventive laser enhancing additive to the laminate in accordance with one embodiment of the first aspect of the invention. By way of example only, the technique will be described in connection with an embodiment wherein the laminate comprises polycarbonate and the inventive laser enhancing additive comprises $CuKI_3$ and ZnS, but illustration of this particular formulation should not be viewed as limiting.

In this example, preparation of the inventive laser enhancing additive can be accomplished by using a twin screw extruder to create a highly concentrated polymer blend (so-called "masterbatch") of the inventive laser enhancing additive. The masterbatch is created by combining the desired host material (e.g., polycarbonate) with the inventive laser enhancing additive, (e.g., ZnS and $CuKI_3$). The host material and the inventive laser enhancing additive are dried prior to blending to minimize any degradation of each of the components. The following are illustrative examples of inventive laser enhancing additive preparations that can be utilized in at least some embodiments of the invention:

Masterbatching the inventive laser enhancing additive together in the same material (e.g., polycarbonate) as the final film material (e.g., polycarbonate) of the laminate.

Masterbatching the inventive laser enhancing additive together in a different material (e.g., polystyrene) than the final film material (e.g., polycarbonate) of the laminate.

Masterbatching the inventive laser enhancing additive separately in the same material (e.g., polycarbonate) as the final film material (e.g., polycarbonate) of the laminate Masterbatching the inventive laser enhancing additive separately in a different material (e.g., polystyrene) than the final film material (e.g., polycarbonate) of the laminate.

The above masterbatch formulations are taken and drawn down to the desired concentration using a single screw extruder to form a monolayer film. To reduce costs, a colayer can be made whereby sensitized material (i.e., material to which the inventive laser enhancing additive is added) is extruded against nonsensitive material. In one embodiment, the optimum concentration for marking of polycarbonate and maximizing optical properties is 0.06% by weight. Concentrations can be used up to 0.1% by weight; concentrations higher than 0.1% may cause visible reductions of the transparency of transparent materials. In one embodiment, more than one of the previously described inventive laser-enhancing additives can be used as an additive (e.g., ZnS and $CuKI_3$ along with BaS and CuI), and other known laser-enhancing additives can also be combined with one or more of the previously described inventive laser-enhancing additives in the above techniques.

Of course, those skilled in the art will appreciate that the above examples of masterbatch formulations and materials are provided by way of example and are not limiting. For example, those skilled in the art will readily understand how the inventive laser enhancing additive can be adapted to work with acrylics, acetates, polystyrenes, urethanes, polyesters (aromatic and aliphatic), polyether nitrides, ABS and polyvinyl chloride, as well as the other laminate materials previously described.

C.3 Illustrative Examples

After the film for the laminate is made, various known processes can be used to adapt it for use with the article being laser engraved or marked. In the example of an ID document to be laser engraved or marked, the following are illustrative exemplary embodiments for constructing an ID document using a film and/or laminate containing the inventive laser enhancing additive.

Figure 3:
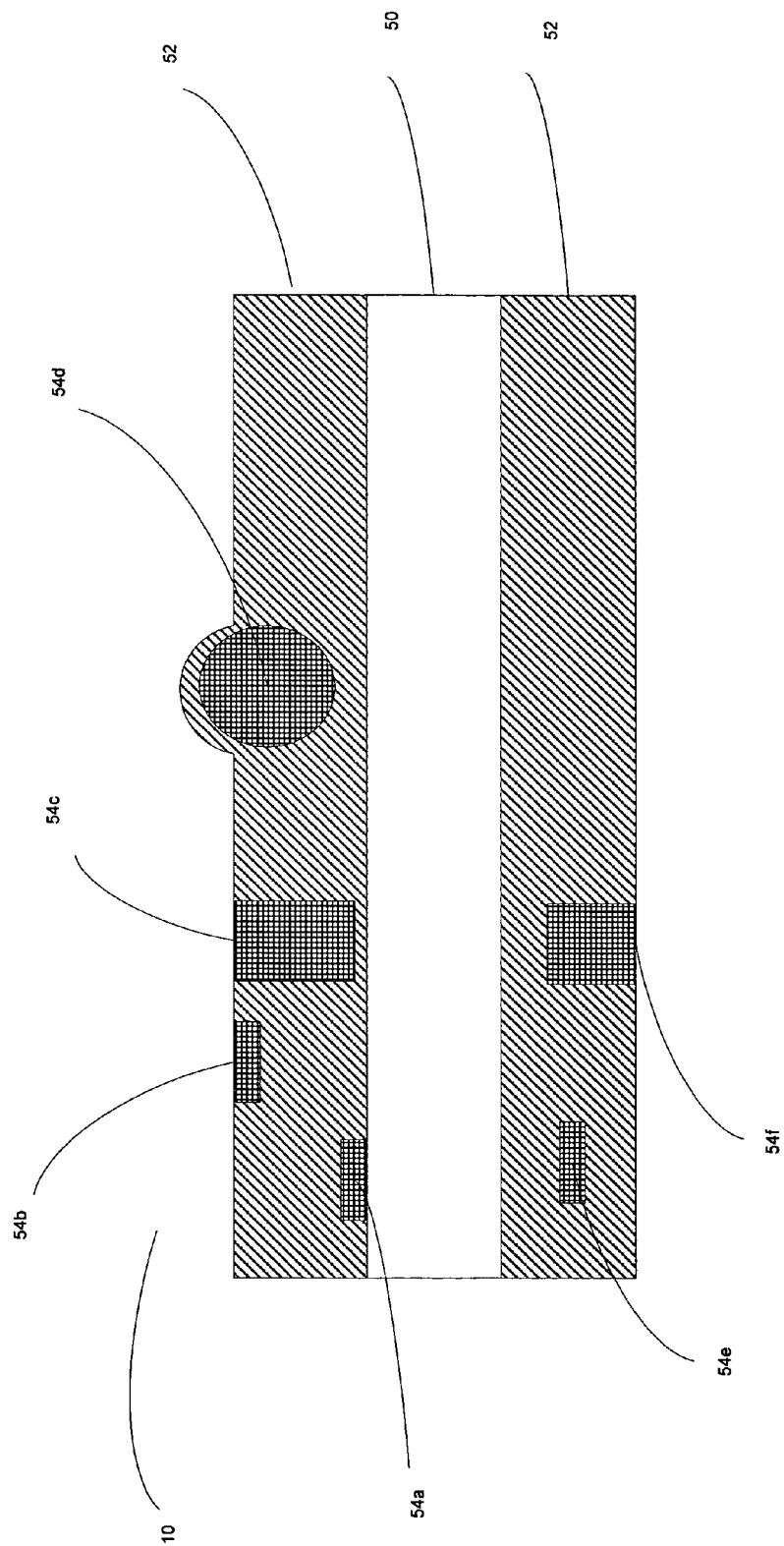
FIG. 3 is an illustrative cross-sectional view of an identification document in accordance with a first embodiment of a first aspect of the invention.

FIG. 3 is an illustrative cross-sectional view of an ID document 10 in accordance with a first embodiment of the first aspect of the invention. In this first embodiment, an inventive ID document 10 preferably includes a multi-layered structure, as shown in FIG. 3. For purposes of illustration, however, the ID document 10 may have a front outward appearance generally similar to the identification document 10 of FIG. 1, although the construction and components of the cross-section shown in FIG. 3 differs from the prior art. The identification document 10 comprises a layer of core material 50 and at least one layer of a first laminate 52 to which the inventive laser enhancing additive has been added (a laminate to which the inventive laser enhancing additive is added will also be referred to herein as the "inventive laminate"). A laminate layer is preferably added to the front and back surface of the core to form the multi-layer structure.

In this example, the core material 50 is 10 mils of a substantially opaque white laminate core, such as a TESLIN-based core. Prior to lamination, the core material 50 can be pre-printed to include an indicia 54A such as fixed or variable information or data. The pre-printing can include screen-printing, offset printing, laser or ink-jet printing, flexography printing, or the like. "Fixed" information may include non-individual dependent information, such as department or company information, state information, etc., etc. Variable information, or information that is unique to the ID document holder, can be printed, for example, via a color laser XEROGRAPHY process.

The fixed and/or variable information can also include one or more built in security features, as well, to help reduce identity fraud. For example, in one embodiment of the invention, portions of the ID document 10, including either or both of the core material 50 and/or the laminate 52, can include a security feature such as a security indicia or security pattern. The security pattern can be applied in an ordered arrangement having a tightly-printed pattern, i.e., having a plurality of finely-divided printed and unprinted areas in close proximity to one another. A tightly-printed pattern may, for example, appear as an often-repeated logo or design or a fine-line printed security pattern such is used in the printing of banknote paper, stock certificates and like and may take the form of filigree, guilloche or other fine-line printing. U.S. Pat. No. 4,653,775 provides an example of such security printing and is hereby incorporated by reference. Note that the laser engraving facilitated by the invention can be used to print a security indicia or security pattern.

In addition, the laser engraving facilitated by the invention can be used to add a digital watermark to any indicia printed (whether conventionally or by laser engraving) on any layer of the ID document 10. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's co-pending U.S. patent application Ser. No. 09/503,881 and U.S. Pat. No. 6,122,403. Techniques for embedding digital watermarks in identification documents are even further detailed, e.g., in Digimarc's co-pending U.S. patent application Ser. Nos. 10/094,593, filed Mar. 6, 2002, and Ser. No. 10/170,223, filed Jun. 10, 2002, co-pending U.S. Provisional Patent Application No. 60/358,321, filed Feb. 19, 2002, and U.S. Pat. No. 5,841,886. Each of the above-mentioned U.S. patent documents is herein incorporated by reference. Additionally, it is noted that the invention encompasses ID documents including more or less features than the illustrated ID document 10.

Referring again to FIG. 3, after printing, the core material 50 is laminated on both sides with 10 mils of the first laminate 52 that has been sensitized to laser energy by the addition of the inventive laser enhancing additive. In this example, the first laminate 52 contains ZnS and $CuKI_3$ additives in a base laminate material such as polyester or polycarbonate. In one implementation of this embodiment, the front and back first laminates 52 can be laminated using an adhesive (not visible in FIG. 3) such as co-polyester or olefin containing adhesive. Other adhesives usable in accordance with this embodiment of the invention include polyester, polyester urethane, polyether urethane or polyolefin hot melt or ultraviolet or thermally cured adhesive. The multi-layered structure is formed during a lamination process, in which adjustments to the processing time, temperature and pressure can be varied to optimize laminations.

In at least some embodiments of the first aspect of the invention, usable laminates usable include those which contain substantially transparent polymers and/or substantially transparent adhesives, or which have substantially transparent polymers and/or substantially transparent adhesives as a part of their structure, e.g., as an extruded feature. The first laminate 52 can comprise a plurality of separate laminate layers, for example a boundary layer and/or a film layer. The first laminate 52 can comprise an optically clear durable plastic film, such as amorphous or biaxially oriented polyester. In at least some embodiments, the laminate need not be substantially transparent, but can be colored or opaque, so long as a grayscale image can be laser engraved onto it. Of course, the types and structures of the laminates described herein are provided only by way of example, those skilled in the art will appreciated that many different types of laminates are usable in accordance with the invention.

In at least some embodiments, the first laminate layers 52 can provide additional security features for the identification document 10. For example, the first laminate 52 may include a low cohesivity polymeric layer, an optically variable ink, an image printed in an ink which is readable in the infra-red or ultraviolet but is invisible in normal white light, an image printed in a fluorescent or phosphorescent ink, or any other available security feature which protects the document against tampering or counterfeiting, and which does not compromise the ability of the first laminate 52 to be laser engraved.

In at least one embodiment (not shown), the first laminate is formed into a pouch into which the core material 50 slips. With a pouch, methods such as heat, pressure, adhesives, and the like, are usable to bond the core material 50 to the first laminate 52 formed into a pouch. Those skilled in the art will appreciate that many known structures and configurations for laminating are usable with the invention.

Referring again to FIG. 3, adhesive can be applied to the first laminate 52 via methods such as solvent coating, casting, or hot melt extrusion. The adhesive may also be coated, cast or extruded onto a surface of the core material 50. The first laminate 52 can then be heat laminated to the core material 50 to form a secure bond. Additional processes that can be used to form the first laminate 52 onto the core material include injection molding or extrusion of a hot melt onto the core material 50. Those skilled in the art will appreciate that virtually any known method can be used to couple the first laminate 52 to the core material 50. For example, techniques such as standard heat and pressure, pressure only, chemical fusion via solvent blending, ultraviolet (UV) methodologies, and/or electron beam (EB) methodologies can be used to laminate the first laminate 52 to the core material 50.

When first laminate 52 is appropriately coupled to the core material 50, the ID document 10 is ready for laser engraving. In at least one embodiment, the laser engraving is used to personalize the ID document. In at least one embodiment, a usable laser for engraving is a neodymium:yttrium aluminum garnet (Nd:YAG) laser using both 3 Watt (W) (103D) and 10 W (Powerline E) power outputs (a laser that is usable with at least one embodiment of the invention can be purchased from Rofin Baasel Lasertech of Boxborough, Mass.). The 10 W laser of this device uses a true grey scale marking software compared to the 3 W which does not. In at least one embodiment, the Nd:YAG laser emits light at a wavelength of about 1064 nanometers (nm).

Because the inventive laser enhancing additive improves the responsiveness of the first laminate 52 to the laser, the time to laser engrave a given area can be decreased as compare to the time to mark a given area in a laminate that does not have the inventive laser enhancing additive, when using the same laser". In addition, the improvement in responsiveness can enable grayscale images, such as images with up to 256 different shades of gray, to be laser engraved into the laminate 52, especially when an Nd:Yag laser (including lamp pumped YAG lasers, diode pumped Nd:Yag lasers, and light pumped Nd:Yag lasers) is used. Those skilled in the art will appreciate that the effective amount of the inventive laser enhancing additive used and the material in which it is used can be adapted to achieve similar improvements in laser engraving when using other types of lasers, such as, excimer lasers and $CO_2$ lasers.

In addition, use of the inventive laser enhancing additive can improve the laser engraving of so-called "vector information" of an identification document. Vector information is non-captured information (such as logos) in an identification document and generally does not include so-called "pixel" information, which is information that is captured, such as signature images and/or photographic images. When the inventive laser enhancing additive is added to a material being laser engraved with vector information, it is possible to sufficiently sensitize the material such that the vector information can be engraved to achieve the "tactile feel" known in the art of laser engraving.

Referring again to FIG. 3, one or more indicia 54B-54F, such as variable information (e.g., birth date, address, biometric information, etc.) is engraved into the over laminate layer 52 through a focused laser beam. In one embodiment, the laser used is an Nd:YAG laser; other suitable lasers (e.g., $CO_2$) can, of course, be similarly employed. As described previously, the area irradiated by the laser absorbs the laser energy and produces heat which causes a visible discoloration in the first laminate 52. The visible discoloration serves as a "mark" or indicator. With some laminates and lasers, the heat from the laser beam causes a foaming as shown in indicia 54D; the foaming can create a raised area in the first laminate 52 that provides a tactile feel when touched. The indicia 54B-F can comprise virtually any type of information, including photographs, data, images, fingerprints, and text. Although not apparent in the cross sectional view of FIG. 3, our testing has shown that the indicia 54B-F can comprise a usable grayscale image (by usable, it is at least meant that image can be used for security purposes, such as identification or authentication). In experiments, the inventor was able to engrave an acceptable gray scale photograph, non-tactile text and tactile text into the laminate layer 52.

As an example, we compared laminate to which the inventive laser enhancing additive was added (in this test, ZnS and $CuKI_3$) additives against a commercially available polycarbonate laminate, manufactured by the Bayer Polymer Division. We engraved a 0.75-inch by 1.0-inch photograph at 750 dpi in each of the Bayer material and our inventive overlaminate containing the inventive laser enhancing additive. Using the same laser at the same power for each (a 3 W 103D laser, as described above), we found that the Bayer material required approximately 40 seconds to engrave an acceptable gray scale photograph. In comparison, the laminate to which the inventive laser enhancing additive was added needed only approximately 20 seconds to engrave an acceptable gray scale photograph by adjusting the frequency of the laser.

Although the embodiment of FIG. 3 illustrates that the first laminate 52 that contains the inventive laser enhancing additive overlays substantially all of the core material 50, in at least some embodiments of the invention, the inventive laser enhancing additive can be added to a laminate that forms merely a portion of the laminate covering a core material 50.

Figure 4:
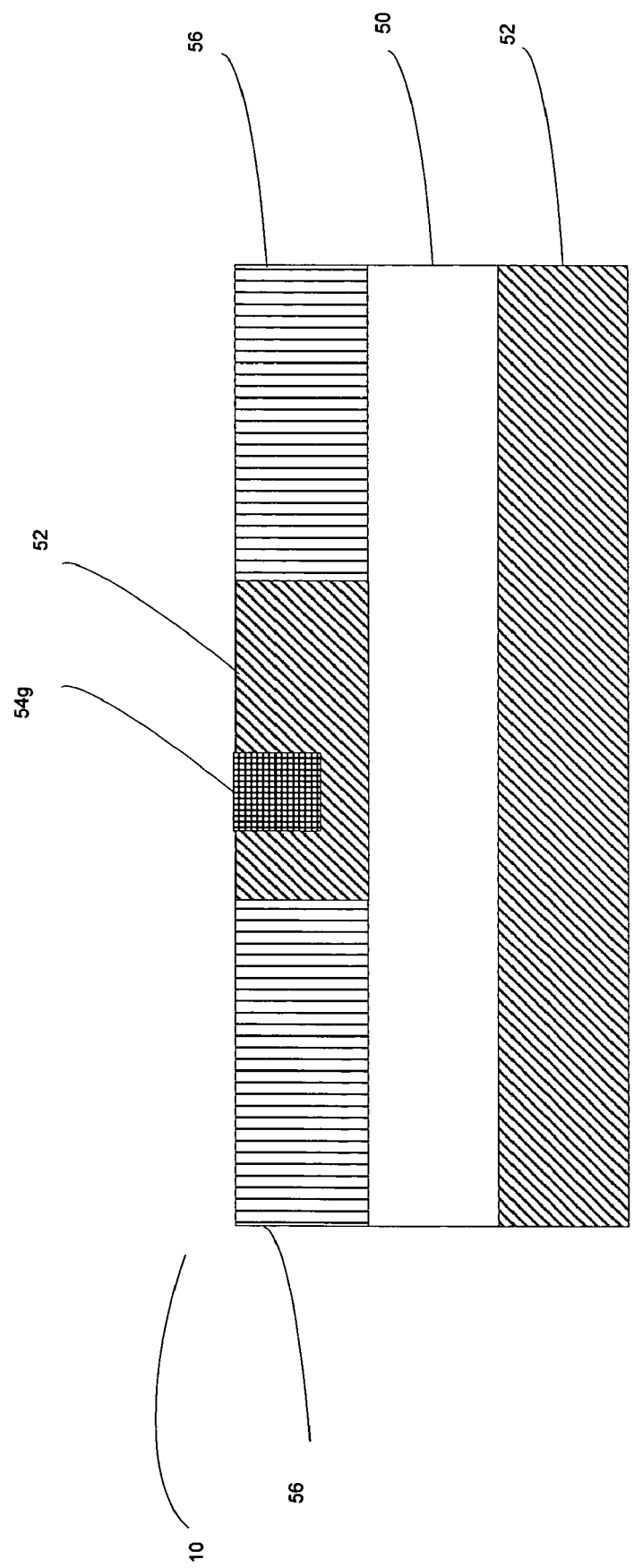
FIG. 4 is an illustrative cross sectional view of an identification document in accordance with a second embodiment of the first aspect of the invention.

For example, FIG. 4 is an illustrative cross sectional view of an identification document in accordance with a second embodiment of the first aspect of the invention. In the embodiment of FIG. 4, the ID document 10 preferably includes a multi-layered structure. For purposes of illustration, however, the ID document 10 may have an front outward appearance generally similar to the identification document 10 of FIG. 1, although the construction and components of the cross-section shown in FIG. 4 differs from the prior art. In the embodiment of FIG. 4, the portion of first laminate 52 containing the inventive laser enhancing additive is disposed at least partially within a layer of another material, such as so-called "plain" laminate 56 (i.e., laminate that does not contain the inventive laser enhancing additive). When a laser beam is applied to the first laminate 52, a third indicium 54G is formed. The plain laminate 56 may comprise a material that is inherently sensitive to laser radiation or can be a material that is insensitive to laser radiation. Note also that the layer of other material in which the first laminate 52 containing the inventive laser enhancing additive is disposed need not even be a laminate at all. Thus, in some articles, the surface of the article can include a portion or "window" of first laminate 52 containing the inventive laser enhancing additive, whereas the rest of the surface is some other material (e.g., ceramic). This configuration may be applicable, for example, in the marking of electronic components and/or devices.

Figure 5:
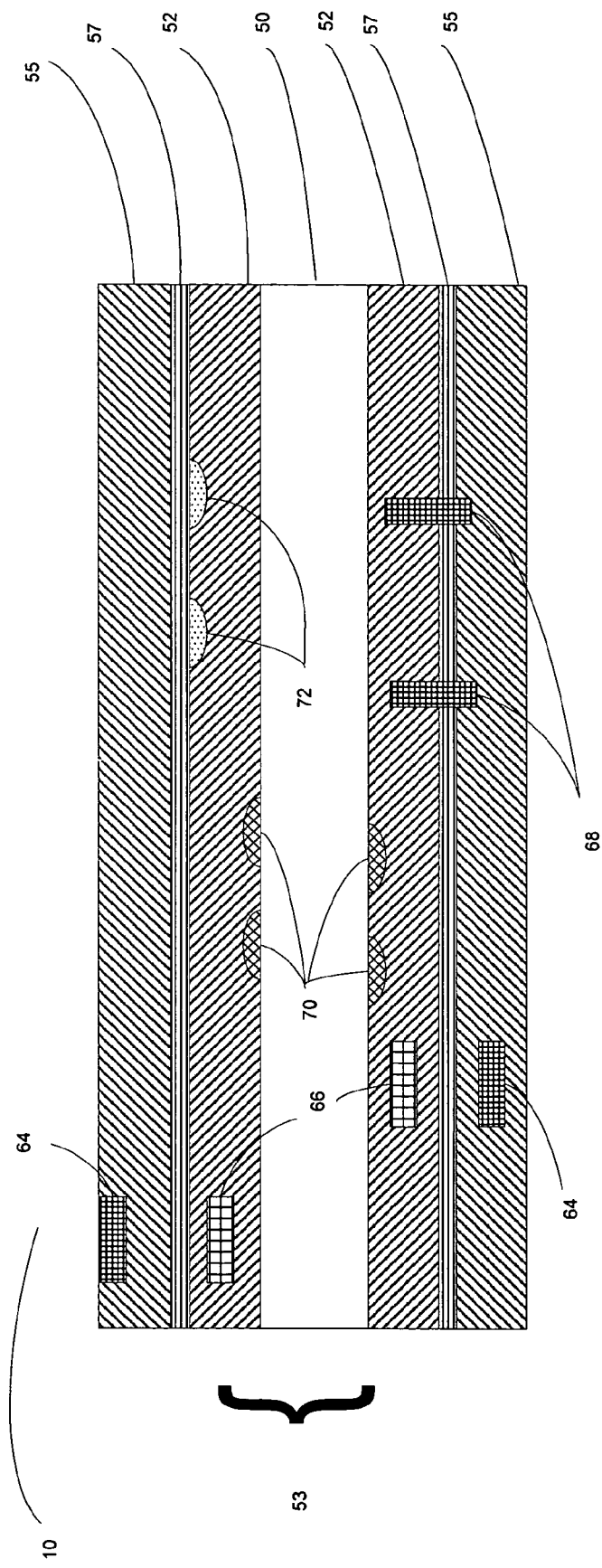
FIG. 5 is an illustrative cross sectional view of an identification document in accordance with a third embodiment of the first aspect of the invention.

FIG. 5 is an illustrative cross sectional view of an identification document 10 in accordance with a third embodiment of the first aspect invention. In the embodiment of FIG. 5, the ID document 10 preferably includes a multi-layered structure. For purposes of illustration, however, the ID document 10 may have an front outward appearance generally similar to the identification document 10 of FIG. 1, although the construction and components of the cross-section shown in FIG. 5 differs from the prior art. In the embodiment of FIG. 5, a first portion of the inventive laser enhancing additive is disposed in a first laminate layer 52 and a second portion of the inventive laser enhancing additive is disposed in a second laminate layer 55. Specifically, in this embodiment, the first laminate layer 52 contains an effective amount of at least one of copper potassium iodide ($CuKI_3$) or copper iodide (CuI) and the second laminate layer 55 contains an effective amount of at least one of the following: zinc sulfide (ZnS), barium sulfide (BaS), ( ), alkyl sulfonate and thioester. The first laminate layer 52 and second laminate layer 55 are constructed and arranged so that a laser beam can pass through both the first laminate layer 52 and the second laminate layer 55, to form indicia 66, 64 in one or both of the first and second laminate layers 52, 55, respectively. As those skilled in the art will appreciate, whether an indicia is formed in a given laminate layer depends on the particular type of laser used the manner in which the laser is used (e.g., pumped), and the duration of the application of laser energy.

It should be understood that although the example of FIG. 5 shows that the first laminate layer 52 contains the effective amount of at least one of copper potassium iodide ($CuKI_3$) or copper iodide (CuI) and the second laminate layer 55 contains the effective amount of at least one of zinc sulfide (ZnS), barium sulfide (BaS), alkyl sulfonate and thioester, the positions of the two compounds in the respective first and second layers could be reversed. That is, the first laminate layer 52 could contain the effective amount of at least one of zinc sulfide (ZnS), barium sulfide (BaS), alkyl sulfonate and thioester, and the second laminate layer 55 could contain the effective amount of copper potassium iodide ($CuKI_3$) or copper iodide (CuI).

Referring again to FIG. 5, the ID document 10 further comprises a layer of core material 50 (in this example, the layer of core material is 10-20 mils thick) to which the first laminate 52 is laminated on either side. The core material 50 is printed with pre-printing 70 on its outer surface. In one embodiment, the pre-printing 70 is nonvariable information, such as organization name, logo, and the like. The first laminate layer 52 can also be printed with printed information 72 using a technique such as dye diffusion thermal transfer. Also, in FIG. 5, a third layer 57 is disposed between the first laminate layer 52 and the second laminate layer 55. The third layer 57 is a material (for example, a laminate or an adhesive) that is transparent to laser radiation and permits a laser beam directed at the second layer 55 to penetrate, at least partially to the first layer 52.

In at least one embodiment, the first laminate 52 can be made from a material that is inherently (i.e., even without the addition of the inventive laser enhancing additive or any portion thereof) more responsive to laser radiation than is the second laminate 55. In this embodiment, when a laser beam is directed through the second and first laminate layers 55, 52, the area in the first laminate 52 that is irradiated can "bubble up" to the second layer 55, to form a bond 68 between the first laminate 52, second laminate 55, and (optionally) the third layer.

In one embodiment, the ID document 10 of the embodiment of FIG. 5 is a multi-layer fused polycarbonate structure used as an ID document. The multi-layered structure preferably includes a core and at least a top and bottom over-laminate. The core material 50 may include a titanium dioxide ($TiO_2$) filled polycarbonate (PC) film, which generally has a whitish color. The core material 50 can have pre printed information 70 thereon prior to the fusing process. Examples of acceptable pre-printing processes include screen-printing, offset printing, laser or ink-jet printing, flexography printing, and the like.

The core material 50 and first laminate 52 are fused (e.g., using heat and pressure, such as by a platen press) together to form a structure 53, which helps to deter delaminating attempts. The structure 53 in this example is a solid PC ID document 10. Adjusting the time, temperature and pressure can help to bond the first laminate 52 to the polycarbonate core material 50. The second laminate 55 can be an overlaminate material.

In one experiment, we compared the engraving properties of an inventive fused polycarbonate structure, including a titanium dioxide filled polycarbonate core and polycarbonate over-laminates with ZnS and $CuKI_3$ additives, against a Muhlbauer polycarbonate card. The comparison involved engraving a 0.75 by 1.0 inch photograph at 750 dpi. The Muhlbauer engraving required between 20 and 25 seconds, while the inventive fused polycarbonate structure required 11-15 seconds engraving time to achieve similar acceptable gray scale tones by adjusting the frequency of the laser.

Figure 6:
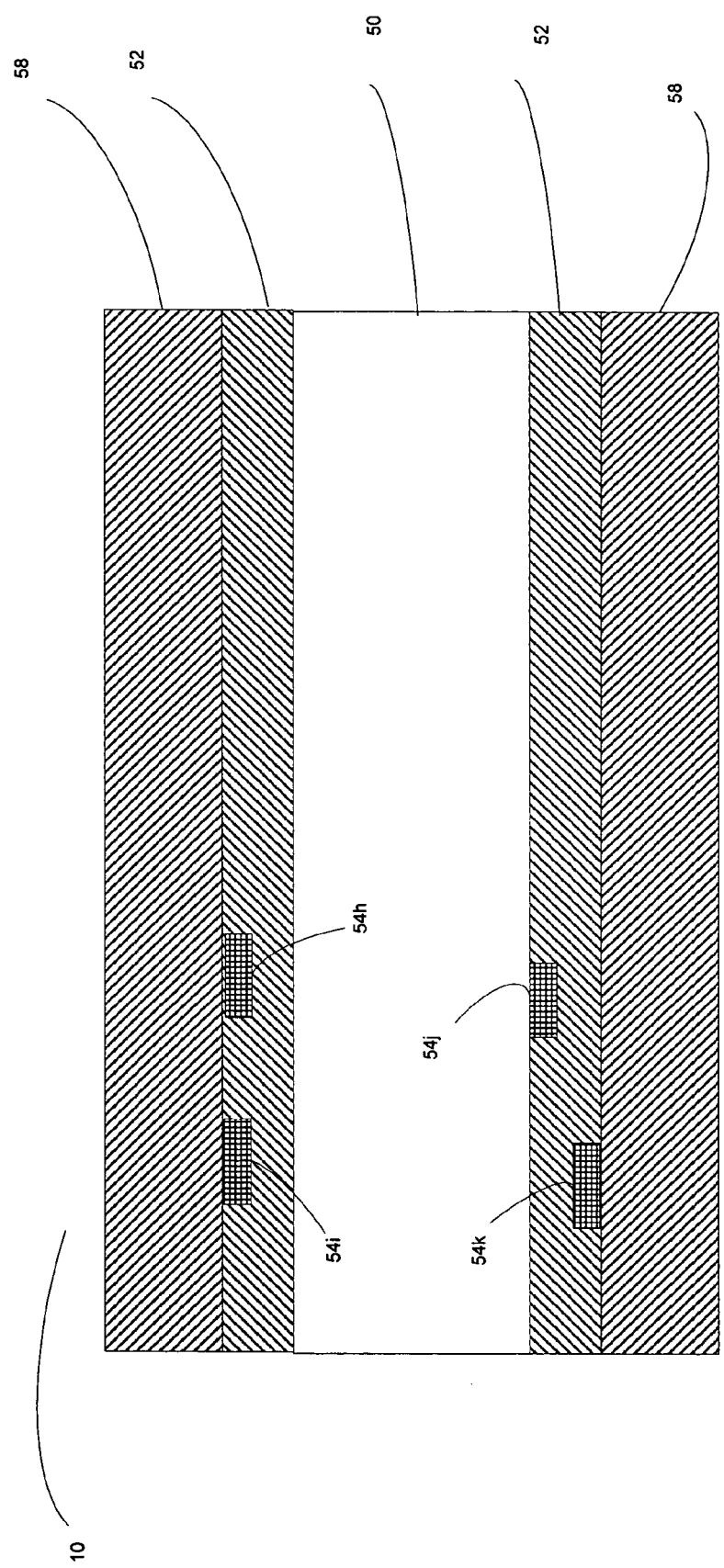
FIG. 6 is an illustrative cross sectional view of an identification document in accordance with a fourth embodiment of the first aspect of the invention.

The inventive laser enhancing additive also can be used in a laminate that has one or more additional laminate layers bonded over it. For example, FIG. 6 is an illustrative cross sectional view of an identification document in accordance with a fourth embodiment of the invention. In the embodiment of FIG. 6, the ID document 10 preferably includes a multi-layered structure. For purposes of illustration, however, the ID document 10 may have a front outward appearance generally similar to the identification document 10 of FIG. 1, although the construction and components of the cross-section shown in FIG. 6 differs from the prior art. In FIG. 6, the ID card 10 includes a core material 50 (shown for illustrative purposes only to be about 10 mils thick) to which is laminated a layer (shown for illustrative purposes only to be about 5 mils thick) of first laminate 52 to which the inventive laser enhancing additive is added. Over the first laminate 52 is a layer of second laminate 58 (shown for illustrative purposes to be about 5 mils thick), which in this embodiment is made from a material that is not sensitive to laser radiation. In this example, the second laminate 58 is a transparent material. A laser is used to engrave the first laminate 52 with indicia 54H-54K. The total thickness of the ID document 10 of FIG. 6 is about 30 mils, which, in at least one embodiment, allows the architecture of the ID document 10 to meet and/or exceed American Association of Motor Vehicle Administrators (AAMVA), American National Standards Institute (ANSI). The total thickness of the ID document 10 of FIG. 6 can also be adapted to meet and International Organization for Standardization (ISO) specifications for identification documents such as ID Cards. It will be appreciated that many other thicknesses of layers are usable to make an ID document that satisfies one or more of the AAMVA, ANSI, and ISO requirements. For example, in FIG. 6, the core material 50 could be 20 mils thick, the first laminate 52 could be 2 mils thick, and the second laminate 58 could be 3 mils thick.

Although FIG. 6 only illustrates a single layer of laminate over the first laminate 52 (which has added to it the inventive laser enhancing additive), it will be appreciated that many more layers can be added over the first laminate 52, so long as the laser being used is able to reach the first laminate 52.

We have found that the inventive laminates described herein may offer one or more advantages. For example, using the inventive laminates can enable the inventive laminates to be laser marked or engraved with usable grayscale images. In addition, using the inventive laminates can enable faster laser engraving or marking at lower laser power levels. Further, the laser engraving that is possible using the inventive laminates is durable, abrasion resistant, and environmentally friendly.

C.4 Additional Embodiments of First Aspect of the Invention

We anticipate that at least the following combinations, and others like them, can be useful embodiments of the first aspect of the invention:

1. A composition having laser engraving properties, comprising:
   a host material; and
   an effective amount of a laser enhancing additive, the laser enhancing additive comprising:
      a first quantity of at least one of copper potassium iodide ($CuKI_3$) or Copper Iodide (CuI); and
      a second quantity of at least one substance selected from the group consisting of zinc sulfide (ZnS), barium sulfide (BaS), alkyl sulfonate, and thioester.

2. The composition as recited in 1 above, wherein the laser enhancing additive is present in an amount from about 0.001 to 100 percent by weight based on the total weight of the composition.

3. The composition as recited in 1 above wherein host material is substantially transparent and the laser enhancing additive is present in an amount from about 0.001 to 0.1 percent by weight based on the total weight of the composition.

4. The composition as recited in 1 above wherein the laser enhancing additive is present in an amount that is about 0.06 percent by weight based on the total weight of the composition.

5. The composition as recited in 4 above, wherein the first and second quantities each comprise about 0.03 percent by weight based on the total weight of the composition.

6. The composition as recited in 1 above wherein the first quantity and the second quantity are the same.

7. The composition as recited in 1 above wherein the first quantity is greater than the second quantity.

8. The composition as recited in 1 above wherein the first quantity is less than the second quantity.

9. The composition as recited in 1 above wherein the composition is laser engraveable by at least one of a diode pumped Nd:Yag laser, light pumped Nd:Yag laser, $CO_2$ laser and excimer laser.

10. The composition as recited in 8 above wherein the composition is laser engraveable to form a grayscale image.

11. The composition as recited in 1 above wherein the host material comprises a material that is not, by itself, sufficiently sensitive to laser radiation to permit gray scale images to be laser engraved in the host material.

12. The composition as recited in 1 above wherein the host material comprises at least one material selected from the group consisting of thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

13. An article of manufacture capable of being laser engraved with a grayscale image, comprising:
   a core layer having a first surface;
   a first layer comprising a first host material, the first host material comprising an effective amount of a first laser enhancing additive comprising at least one of one of copper potassium iodide ($CuKI_3$) or Copper Iodide (CuI); and
   a second layer comprising a second host material, the second layer oriented in relation to the first host material such that a single laser beam can penetrate both at least a portion of the first layer and at least a portion of the second layer, the second host material comprising an effective amount of a second laser enhancing additive, the second laser enhancing additive selected from the group consisting of zinc sulfide (ZnS), barium sulfide (BaS), alkyl sulfonate, and thioester;
   wherein the first and second layers are operably coupled to each other and at least one of the first and second layers is operably coupled to the first surface of the core layer.

14. The article of manufacture as recited in 13 above, further comprising a grayscale image laser engraved into at least one of the first and second layers.

15. The article of manufacture recited in 13 above, wherein the article of manufacture is an identification document.

16. The article of manufacture of recited in 13 above, wherein the first layer is substantially transparent and the first laser enhancing additive is present in an amount from about 0.001 to 0.100 percent by weight based on the total weight of the first host material.

17. The article of manufacture recited in 13 above, wherein the second layer is substantially transparent and the second laser enhancing additive is present in an amount from about 0.001 to 1.00 percent by weight based on the total weight of the second host material.

18. The article of manufacture recited in 13 above wherein at least one of the first and second host materials comprises a material that is less sensitive to laser radiation than the other of the first and second host materials.

19. The article of manufacture recited in 13 above, wherein at least one of the first and second host materials comprises at least one material selected from the group consisting of thermosetting material, thermoplastic, polymer, copolymer, polycarbonate, fused polycarbonate, polyester, amorphous polyester, polyolefin, silicon-filled polyolefin, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

20. The article of manufacture recited in 13 above further comprising a third layer disposed between the first and second layers, the third layer comprising a material that permits transmission of a laser beam therethrough.

21. The article of manufacture recited in 13 above, wherein the first and second layers are substantially transparent.

22. The article of manufacture recited in 13 above, wherein the core layer is substantially opaque.

23. A method of engraving a material by exposing the material to laser radiation, comprising:
adding to the material an effective amount of a laser enhancing additive, the laser enhancing additive comprising:
at least one of copper potassium iodide ($CuKI_3$) or Copper Iodide (CuI); and
at least one substance selected from the group consisting of zinc sulfide (ZnS), barium sulfide (BaS), alkyl sulfonate, and thioester; and
exposing the material to laser radiation in a manner that causes the material to be engraved by the laser radiation.

24. The method recited in 23 above wherein the effective amount of the laser enhancing additive comprises 0.001% to 100% by weight of the material.

25. The method recited in 23 above wherein the material is substantially transparent and wherein the effective amount of the laser enhancing additive comprises 0.001% to 0.1% by weight of the material.

26. The method recited in 23 above further comprising laser engraving an indicium in grayscale in at least a portion of the material.

27. The method recited in 23 above further comprising using the laser engraved material in the manufacture of an identification document.

28. A method of laser engraving a gray scale image on an article having first and second layers, comprising:
adding to the first layer a first effective amount of least one of copper potassium iodide ($CuKI_3$) and Copper Iodide (CuI);
adding to the second layer a second effective amount of at least one substance selected from the group consisting of zinc sulfide (ZnS), barium sulfide (BaS), alkyl sulfonate, and thioester; and
directing a laser beam so that it passes through at least a portion of the first layer and at least a portion of the second layer to form a grayscale image in at least one of the first and second layers.

29. The method recited in 23 above, further comprising:
directing a laser beam so that it that it passes through at least a portion of the first layer and at least a portion of the second layer such that the first and second layers become affixed to each other.

30. The method recited in 28 above wherein the first effective amount and the second effective amount together comprise about 0.001 to 0.1 percent by weight of the total weight of the first and second layers.

31. The method recited in 28 above further comprising using the material in the manufacture of an identification document.

32. A multilayer identification document, comprising:
a core layer;
a film layer overlaying at least a portion of the core layer and affixed to the portion of the core layer, the film layer comprising an additive that comprises:
an effective amount of least one of copper potassium iodide ($CuKI_3$) or Copper Iodide (CuI); and
an effective amount of at least one substance selected from the group consisting of zinc sulfide (ZnS), barium sulfide (BaS), alkyl sulfonate, and thioester.

33. The identification document recited in 32 above, wherein the identification document bears a first indicia thereon, the indicia obtained by exposing the film layer to a laser beam.

34. The identification document recited in 33 above, wherein the indicia comprises at least one of a gray scale image, photograph, text, tactile text, graphics, information, security pattern, security indicia, and digital watermark.

35. The identification document recited in 33 above wherein the first indicia comprises variable information.

36. The identification document recited in 32 above, wherein the film layer is substantially transparent and wherein the additive comprises about 0.001 to 0.10 percent by weight of the film layer.

37. The identification document recited in 36 above, wherein the film layer further comprises:
a first sub layer comprising an effective amount of least one of copper potassium iodide ($CuKI_3$) or Copper Iodide (CuI); and
a second sub layer comprising an effective amount of at least one substance selected from the group consisting of zinc sulfide (ZnS), barium sulfide (BaS), alkyl sulfonate, and thioester.

38. A process for making an identification document, comprising:
overlaying at least a portion of a core layer with a film layer, the film layer comprising:
at least one of copper potassium iodide ($CuKI_3$) or Copper Iodide (CuI); and
at least one substance selected from the group consisting of zinc sulfide (ZnS), barium sulfide (BaS), alkyl sulfonate, and thioester; and
affixing the film layer to the portion of the core layer.

39. The process recited in 38 above, further comprising directing a laser beam to at least a portion of the film layer to produce a first grayscale indicia in the portion of the film layer.

D. Second Aspect of the Invention

D.1 Features

In a second aspect of the invention, the above-described inventive laser enhancing additive can be added to a coating on a at least a portion of a surface to be laser engraved or marked, to help to overcome the problem that the material being laser engraved or marked is responsive to laser engraving and/or is not responsive enough to be capable of having grayscale images laser engraved thereon. We have found that the ability to laser engrave at least some materials can be improved and/or the time to laser engrave at least some materials can be reduced, by coating the area of the given material to be engraved with a coating that contains the inventive laser enhancing additive. Note also that the coating containing the inventive laser enhancing additive can be applied to a laminate or another coating. We also have found that the compounds that make up the inventive laser sensitive additives described herein can be divided over two or more coatings, or a coating and a laminate, to provide improved laser engraving performance.

A least one embodiment of the second aspect of the invention is based on the surprising discovery that the process of laser engraving of materials, especially materials used in the manufacture of identification documents, is improved and enhanced by coating the area of the material to be engraved with a coating that includes a first effective amount of a first composition, the first composition being at least one of copper potassium iodide ($CuKI_3$) or copper iodide (CuI) together with a second effective amount of a second composition, the second composition being at least one of the following: zinc sulfide (ZnS), barium sulfide (BaS), alkyl sulfonate (e.g., $RSO_2Na$ or $R-OSO_2Na$), and Thioester (e.g., substances containing —SH). As with the first aspect of the invention, the combination of CuI or $CuKI_3$ together with at least one of ZnS, BaS, alkyl sulfonate, and thioester continues to be referred to as the "inventive laser enhancing additive".

In at least some embodiments, the resultant concentration of the inventive laser enhancing additive in the coating, by weight, ranges from 0.001% to 0.1% by weight. In at least some embodiments, the inventive laser enhancing additive is added at larger concentrations (e.g., from 0.1% to 100%). At concentrations larger than 0.1%, the inventive laser enhancing additive can still be used to enhance laser marking or engraving of an article or surface being coated, but at possible sacrifice of some of the transparency of the coating (if, in fact, the coating is substantially transparent or translucent to begin with). Advantageously, in at least one embodiment, the laser enhancing additive is about 0.06% by weight in the coating. In another advantageous embodiment, the 0.06% by weight includes 0.03% by weight of at least one of CuI or $CuKI_3$ and 0.03% by weight of at least one of ZnS, BaS, alkyl sulfonate, and thioester.

Of course, those skilled in the art will appreciate that other concentration ranges for the laser enhancing formulations may be usable, especially when the coating is applied to opaque materials and colored materials. In addition, it will be appreciated that the proportions of the at least one of CuI or $CuKI_3$ can vary, as can proportions of the at least one of ZnS, BaS, alkyl sulfonate, and thioester also can vary. That is, a given composition could have, for example (using for purely illustrative purposes the example of a composition containing CuI and BaS), equal amounts of CuI and BaS, or 3 parts CuI to 5 parts BaS, 2 parts CuI to 1 part BaS, etc. We expect that those skilled in the art will be able to determine optimum proportions without undue experimentation. In addition, we note that at least one advantageous compound that we have tested uses the two sub compositions (e.g., the CuI and BaS, in this example) in equal proportions.

The concentration of the inventive laser enhancing additive that is usable with a given coating is at least in part dependent on the properties of the coating (especially the binder material in the coating) laminate and the ultimate use, durability, environmental conditions, etc., to which the coating is subject. It is possible that higher concentrations of the laser enhancing formulations in the coating may affect one or more properties of the coating, such as transparency, durability, malleability, opacity, rigidity, etc. Of course, appropriate quantities of the additives can be determined for a particular coating application without undue experimentation. Additional factors may include engraving time and process and desired engraving quality.

It is contemplated that the inventive laser enhancing additive can be added to a coating that is applied (by virtually any known method) to virtually any surface, article, or product., to enable the surface, article, or product to be laser engraved, especially with a high quality grayscale image. Accordingly, we believe that the inventive laser enhancing laminate has applicability to the manufacture many different articles that can be coated, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a coating material that contains the inventive laser enhancing additive and then laser engraved or marked.

As those skilled in the art will appreciate, the effective amounts of the first and second compositions that are added to the coating can vary depending on the type of coating (e.g., the binder material and/or other additives present in the coating), the material being coated, and on the laser engraving technique being employed. In at least one embodiment, the inventive laser enhancing additive in the coating includes equivalent amounts of the first and second compositions described above. In at least one embodiment, the coating includes more of the second composition than the first composition. In at least one embodiment, the coating includes more of the first composition than the second composition.

As those skilled in the art also will appreciate, the inventive laser enhancing additive can be added to many different types of coatings, including organic coatings and aqueous coatings, substantially transparent coatings and non-transparent coatings. In addition, in at least some embodiments, the coating containing the inventive laser enhancing additive can further comprise a binder, which can be, for example, latex, emulsion, a thermoset binder or a thermoplastic binder. Illustrative examples of binder materials which we have found to be usable include resins, polyesters, polycarbonates, vinyls, acrylates, urethanes, and cellulose based materials. We anticipate that those skilled in the art will readily be able to formulate coatings containing the inventive laser enhancing additive using many other binder materials, such as lacquer, varnish, latex, acrylic, epoxy resins, nitrocellulose, alkyd resins, melamine formalaldehyde, polyamides, silicone, and polyvinyl butyral. Those skilled in the art also will appreciate that virtually any resin able to be formed into a coating could be used with the invention. Of course, a coating containing the inventive laser enhancing additive can also include other additives known in the art, such as colorants (e.g., pigments or dyes), stabilizers, lubricants, adhesion promoting agents, toners, surfactants, anti-static agents, thickeners, thixotropic agents, and the like.

By applying a coating containing the inventive laser enhancing additive (also referred to herein as the "inventive coating") to a surface of a material to be laser engraved, we have found that we can form high quality images and other engravings on articles such as multi-layered ID documents, at acceptable throughput rates. The high quality images can include both grayscale laser engraved images (as described herein) and full color laser engraved images (which are more particularly described in applicants' commonly assigned U.S. provisional patent application Ser. No. 60/344,674 entitled "Full Color Laser Engraved systems for Identification Card Imaging", filed Dec. 24, 2001, which invention also will be described in a nonprovisional patent application claiming the benefit of this provisional patent application, which is to be filed prior to Dec. 24, 2002 and which was assigned Ser. No. 10/330,034). Further, we anticipate that the inventive coating can be applied to virtually any part of the surface of any article where laser marking, especially laser engraving of grayscale images, is desired. The entire article or surface need not be coated.

We believe that the laser engraving or marking of various articles, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, toys, etc., can be improved by coating the surface of the article to be engraved with the inventive coating. This improvement can be achieved on articles whose surface is a laminate to be laser engraved. In addition, the inventive coating, as contemplated herein, can be applied over other coatings (or materials) that cover the surface of an article to be laser engraved or marked, so long as the "intervening" materials between the surface being laser engraved or marked and the inventive coating are transparent to laser radiation.

Figure 2:
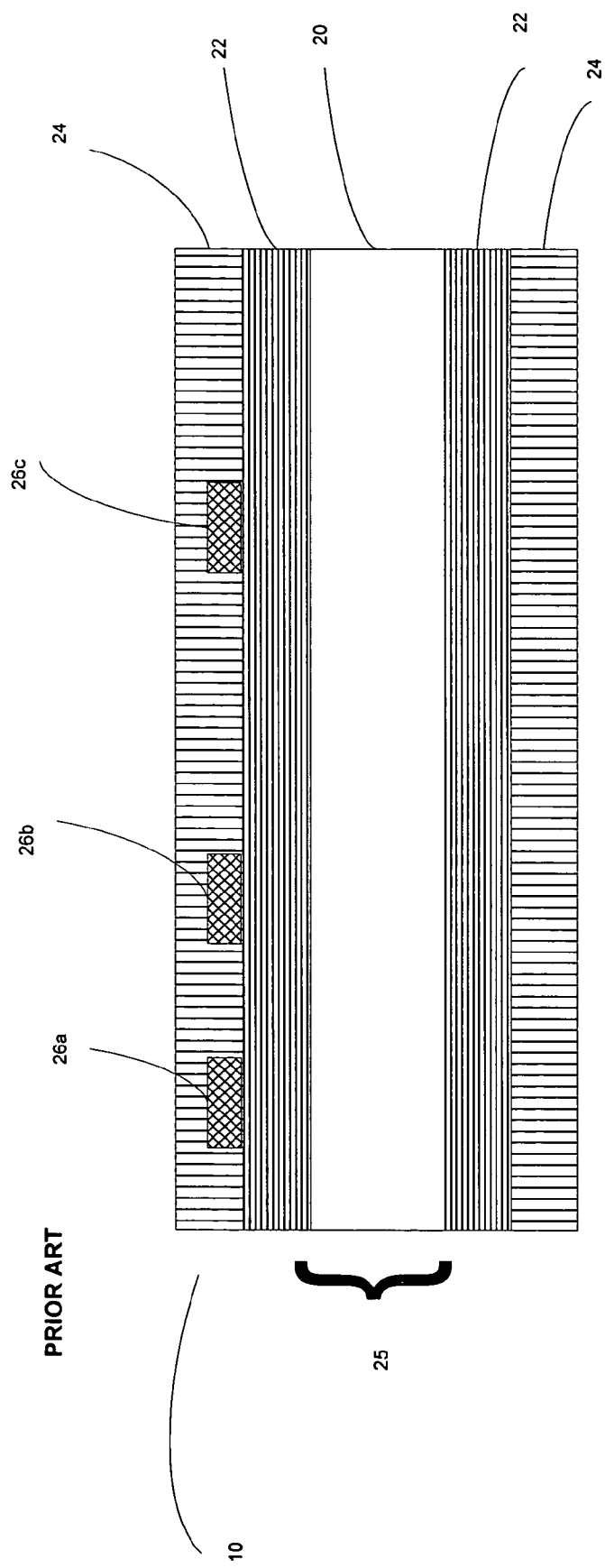
FIG. 2 is an illustrative cross section of the prior art identification document of FIG. 1, taken along the A-A line.

In at least one embodiment, the inventive coating is used to improve the manufacture of an identification document, such as the identification document 10 shown in FIGS. 1 and 2. The security of the document can be enhanced through selective coating of the core layer of the identification document 10 with the inventive coating Because the coating material can be applied through a controlled process (e.g., offset, flexography, pad printing, or screen printing), the placement of the inventive coating (and, thus, the laser enhancing additive) can be precisely controlled. The coating material is sensitive (or responsive to) the laser, so the placement of the inventive coating dictates the location of the engraved information. Selective placement of the laser sensitive materials also help to prevent counterfeiting, since the laser engraveable areas are limited.

In one embodiment, the inventive coating is applied to an identification document and the issuing authority for the identification document (e.g., a state's DMV, a passport authority, etc.) can be involved with the design layout, creating unique coating patterns for the document's core. The coating layout can be held secret, further enhancing the security of the document, while creating obstacles for the counterfeiter. Changing the coating materials (e.g., the binder) or additive concentration or adhesive will alter the coating placement and response, creating even further obstacles for the counterfeiter and may make one or more portions of the identification document impossible to engrave with a usable indicia and difficult to duplicate.

Note also that use of the inventive coating described herein may provide at least some of the same advantages (especially in the production of grayscale images) previously described in connection with use of the inventive laser enhancing laminate, and they are not repeated here. Further, the lasers previously described in connection with the first aspect of the invention are similarly usable in this second aspect of the invention, and their description is not repeated here.

In another embodiment of the invention (illustrated further herein in connection with FIG. 8), the inventive laser enhancing additive can be divided between two optically adjacent layers (e.g., a first layer having a coating and a laminate, or two adjacent laminates (as previously described), or a first layer having a coating and a second layer having a coating). This embodiment can be advantageous for security purposes. For example, during laser engraving, the same visible image can be engraved in both of the two layers, but, depending on the proportions of the inventive laser additive (and/or its layer component parts) disposed in each layer, the visible image will not necessarily look exactly the same in each layer. This can provide a visual effect that is difficult to duplicate.

For example, assume that a layer that is optically "closer" to the laser beam (e.g., a top layer) has a first concentration of the inventive laser enhancing additives and a second layer that is optically more distant (e.g., a layer below the top layer) has a second, higher concentration of the inventive laser enhancing additives. When these two layers are laser engraved, the bottom layer will have a visible laser engraved image (e.g., a grayscale image) and the top layer will have a so-called "latent" laser engraved image that can be fainter but still visually perceptible to the naked human eye. It also is contemplated that the either of the two layers could contain colorants (e.g., both visible and non visible (e.g., IR, UV) colorants that further differentiate between the visible laser engraved image and the latent laser engraved image.

By "optically adjacent", it is meant that a laser can pass through from one layer (e.g., a laminate) to another layer (e.g., a second laminate or a core layer or layer having a coating thereon), such that both layers can be laser engraved by the same laser beam at substantially the same time. Two layers that are optically adjacent need not be literally adjacent, although they can be. The two layers can be directly adjacent (e.g., two layers that are fused together), or can be separated by a material that permits the laser beam to pass therethrough but does not itself necessarily have to react to the laser beam. As an example, for optical adjacency, the two layers can be separated by an adhesive that permits laser light to pass therethrough), or can be separated by another type of layer (e.g., a thin film layer) that permits laser light to pass through).

By "dividing the laser enhancing additive", at least either of the following embodiments is included:
  (a) the entire additive in the entire desired concentration, e.g. 0.06% by weight, is divided between two optically adjacent layers, for example 0.03% in a first layer of laminate and 0.03% in a coating applied to a second laminate that is optically adjacent to the first laminate, or 0.06% by weight in one layer comprising a coating and 0.03% by weight in another layer comprising a coating); or
  (b) a first component of the inventive laser enhancing additive is provided in a first layer (the "first component" is one of the two components in the inventive laser enhancing additive, either the component comprising at least one of copper iodide and copper potassium iodide or the component comprising at least one of zinc sulfide, barium sulfide, alkyl sulfonate, and thioester) and a second component of the inventive laser enhancing additive (e.g., the other of the two components in the inventive laser enhancing additive) is provided in another layer that is optically adjacent to the first layer.

For (a) and (b) above, the two layers can be, for example:
  (i) two laminates
  (ii) two coatings applied to a given laminate;
  (iii) a core layer with a coating and a laminate coupled to the core layer;
  (iv) a laminate and a coating applied over the laminate;
  (v) a first laminate with a coating coupled to a second laminate with a coating.

Finally, in another aspect of the invention, we have made the surprising discovery, however, that the LAZERFLAIR pigment can be added to a coating (in a similar manner as adding the above described inventive laser enhancing additive to a coating) to enable the laser engraving or marking of grayscale indicia on the article. It is known that the LAZERFLAIR pigment is a laser enhancing additive when added to the actual material to be engraved (see, e.g., the Internet web page http://www.empigments.com/LazerFlair.cfm) such that contrast can be improved. Our testing has shown, however, that LAZERFLAIR also can be added to a coating to improve the laser engraving of an article (e.g., a core layer in an identification document) to which the coating is applied. The LAZERFLAIR additive is available from EM Pigments (EM Pigments can be contacted through 7 Skyline Drive, Hawthorne, N.Y. 10532 USA).

D.2 Preparation/Manufacture

Embodiments of the inventive coating can be prepared in any customary manner known to those skilled in the art. For example, in one embodiment where the inventive coating comprises an organic polymeric binder, copper potassium iodide, and zinc sulfide, the copper potassium iodide and zinc sulfide can be mixed into the organic polymeric binder during mixing using a blender; the additive can be ground using, for example, a ball mill to reduce particle size. extrusion of the of the organic polymeric binder.

In another embodiment, the inventive laser enhancing additive can be added to the coating as part of a masterbatch, such as was described previously for the inventive laser enhancing additives that were added to laminates. For example, a masterbatch containing 0.03% by weight of copper potassium iodide and 0.03% by weight of zinc sulfide can be produced and mixed with org), each of the two compounds.

Although at least one advantageous embodiment of the invention uses a coating that is a liquid form when applied to the ID document, use of a liquid coating is not necessary. For example, those skilled in the art can, without undue experimentation, use the inventive laser enhancing additive in a coating that is applied in a non-liquid form (e.g., solid or powder that liquefies upon heating).

D.3 Illustrative Examples

Figure 7:
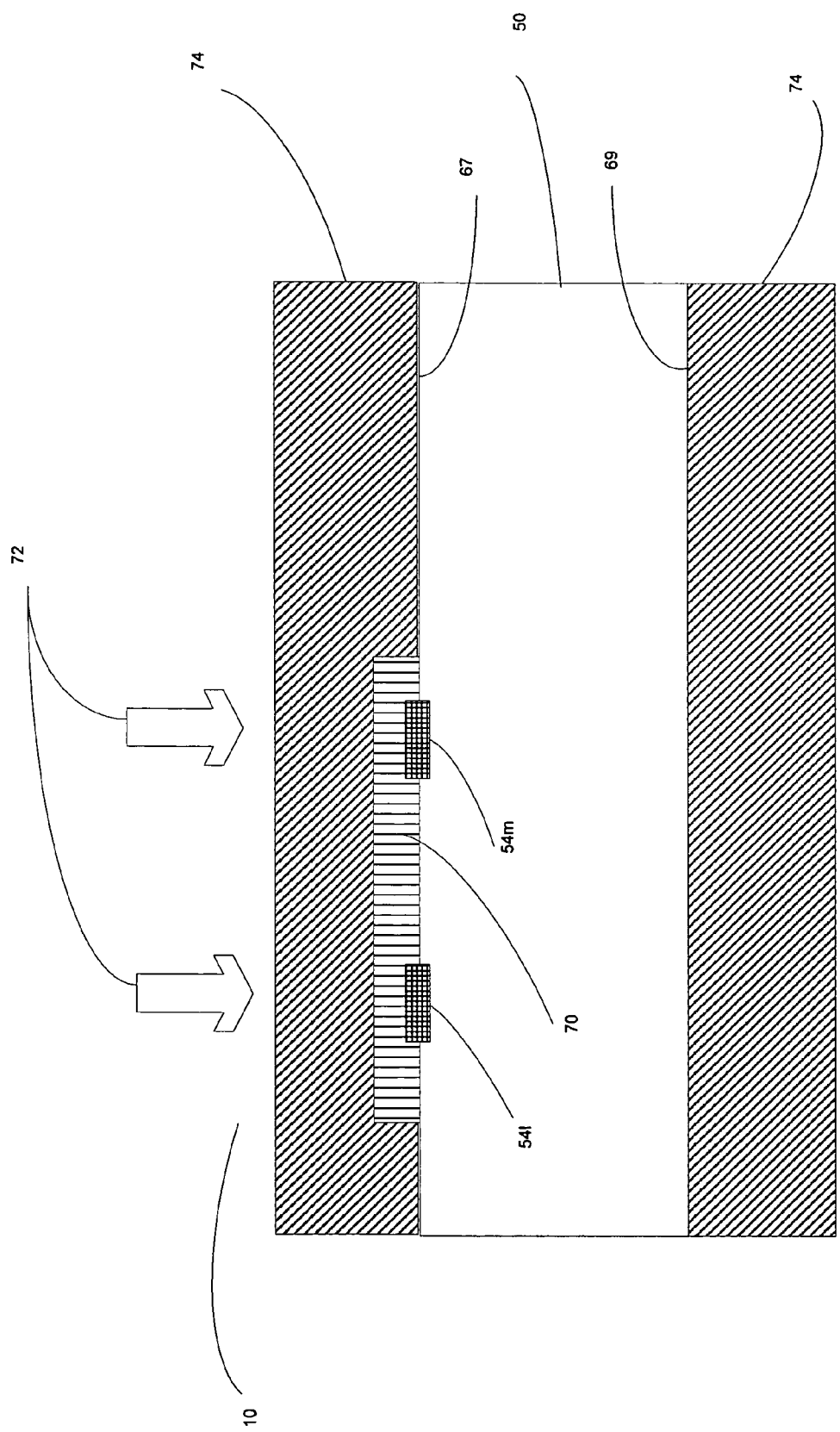
FIG. 7 is an illustrative cross sectional view of an identification document in accordance with a first embodiment of a second aspect of the invention.

FIG. 7 is an illustrative cross sectional view of an identification document 10 in accordance with a one embodiment of the second aspect of the invention. In the embodiment of FIG. 7, the ID document 10 preferably includes a multi-layered structure. For purposes of illustration, however, the ID document 10 may have an front outward appearance generally similar to the identification document 10 of FIG. 1, although the construction and components of the cross-section shown in FIG. 7 differs from the prior art. In FIG. 7, a core material 50 (which for illustrative purposes only is TESLIN), has top surface 67 and bottom surface 69. Although not illustrated in FIG. 7, the core material 50 also could be pre printed with one or more indicia, such as variable information about the bearer of the identification document 10, by a method such as color laser Xerography (note that illustrative examples of printing on the core layer 50 are shown in FIG. 5). A portion of the top surface 67 of the core layer 50 is coated with an inventive coating 70 containing the inventive laser enhancing additive. The inventive coating 70 could, of course, be applied to the bottom surface 69, if desired.

In FIG. 7, the coating 70 can be applied selectively, so that only specific areas of the core material 50 are sensitized for laser engraving. Thus, energy 72 from a laser (not shown) can be specifically directed at the area of the ID document 10 that contains the inventive coating 70, to produce indicia 54*l*, 54*m* on the material that was coated (which, in this example, is the core layer 50). Such selective application of the inventive coating 70 can be advantageous, for example, in the manufacture of identification documents, because the placement and locations of the coating can be kept secret, to help hinder fraud. For example, counterfeiters may not be able to tell what information on the card has been laser engraved and what has not. Even those counterfeiters with access to a laser may not know which areas of the identification document are engraveable. Changing any of the components in the identification document, such as the binder, the inventive laser enhancing additive, or the concentration of the inventive laser enhancing additive.

Another anti-fraud advantage can be seen in the embodiment of FIG. 7. If the core layer 50 is pre-printed with non-variable or non-personal information (such as the name of the issuing authority), then coated with the inventive coating 70, the ID document 10 can later be personalized (e.g., have variable information, such an image, signature, birthdate, or biometric data) by laser engraving the coated portions of the core layer 50 with the variable information. This laser engraving can even occur if a laminate is applied over the inventive coating 70, if the laminate permits laser energy 72 to pass therethrough to the inventive coating 70 and the core layer 50.

In FIG. 7, a laminate 74 is shown as being disposed on top of the inventive coating 70. The laminate 74 can be applied before or after the coated areas of the core layer 50 are laser engraved. For example, if the laminate 74 is transparent to laser radiation, applying it over the inventive coating 70 will not interfere with the ability of the laser radiation 72 to penetrate through to the inventive coating 70 and the core layer 50. If, however, the laminate 74 is not transparent to laser radiation 72, it can be applied after the laser engraving of the core material 50 has occurred.

The inventive coating 70 can be applied to the surface 67 by any known method (e.g., by offset, flexography, screen-printing, spraying, dipping, immersion, brushing, rolling, masking desired coating areas, etc.). The thickness of the coating 70 is dependent on the article being coated, but can range from about 0.01 microns to about 50 microns for ID documents such as ID cards. It will be appreciated that other articles being laser engraved may require or use coatings having different thicknesses.

Although FIG. 7 illustrates that the coating 70 covers only a portion of the top surface 67, this is not limiting. The coating 70 can be applied to any surface, and can, if desired, cover the entire surface.

We have found that the inventive coatings described herein may offer one or more advantages. For example, using the inventive coatings can enable the materials being coated to be laser marked or engraved with usable grayscale images. In addition, using the inventive coatings can enable faster laser engraving or marking, at lower laser power levels. Also, the inventive coatings can be selectively applied to articles such as identification documents to increase security and deter fraud. Further, the laser engraving that is possible using the inventive coatings is durable, abrasion resistant, and environmentally friendly.

D.4 Additional Embodiments of the Second Aspect of the Invention

We anticipate that at least the following combinations, and others like them, can be useful embodiments of the second aspect of the invention:

1. A coating having laser engraving properties, comprising:
   a liquid carrier material; and
   an effective amount of a laser enhancing additive, the laser enhancing additive comprising:
   a first quantity of at least one of copper potassium iodide ($CuKI_3$) or Copper Iodide (CuI); and a second quantity of at least one substance selected from the group consisting of zinc sulfide (ZnS), barium sulfide (BaS), alkyl sulfonate, and thioester.

2. The coating recited in 1 above wherein the laser enhancing additive is present in an amount from about 0.001 to 100 percent by weight based on the total weight of the composition.

3. The coating recited in 1 above wherein the liquid carrier material is substantially transparent and the laser enhancing additive is present in an amount from about 0.001 to 0.1 percent by weight based on the total weight of the composition.

4. The coating recited in 1 above wherein the laser enhancing additive is present in an amount that is about 0.06 percent by weight based on the total weight of the composition.

5. The coating recited in 4 above, wherein the first and second quantities each comprise about 0.03 percent by weight based on the total weight of the composition.

6. The coating recited in 1 above wherein the first quantity and the second quantity are the same.

7. The coating recited in 1 above wherein the first quantity is greater than the second quantity.

8. The coating recited in 1 above wherein the first quantity is less than the second quantity.

9. The coating recited in 1 above wherein a substrate coated with the coating is laser engraveable by at least one of a diode pumped Nd:Yag laser, light pumped Nd:Yag laser, $CO_2$ laser and excimer laser.

10. The coating recited in 1 above wherein the liquid carrier material comprises at least one material selected from the group consisting of resins, polyesters, polycarbonates, vinyls, acrylates, urethanes, and cellulose based materials. [NEED TO LIST USABLE COATINGS HERE] [ALSO, INVENTORS: WILL ANY OF THE FOLLOWING WORK? NOTE THAT ALL OF THESE WERE LISTED AS LAMINATES IN THE "LAMINATE" APPLICATION]thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

11. A substrate capable of being laser engraved with a grayscale indicia, comprising:
a core layer having a first surface; and
a coating applied to at least a first area of the first surface, the coating comprising:
a first effective amount of a first compound comprising at least one of one of copper potassium iodide ($CuKI_3$) or Copper Iodide (CuI); and
a second effective amount of a second compound, the second compound selected from the group consisting of zinc sulfide (ZnS), barium sulfide (BaS), ( ), alkyl sulfonate, and thioester;
wherein laser energy directed at the first area of the core layer is capable of forming a grayscale indicia therein.

12. A substrate capable of being laser engraved with a grayscale indicia, comprising:
a core layer having a first surface;
a first coating applied to at least a first area of the first surface, the first coating comprising an effective amount of a first laser enhancing additive comprising at least one of one of copper potassium iodide ($CuKI_3$) or Copper Iodide (CuI); and
a second coating applied to at least a second area of the core layer, the second coating comprising an effective amount of a second laser enhancing additive, the second laser enhancing additive selected from the group consisting of zinc sulfide (ZnS), barium sulfide (BaS), ( ), alkyl sulfonate, and thioester;
the first and second areas at least partially overlapping on the core layer to define a third area on the core layer;
wherein laser energy directed at the third area of the core layer is capable of forming a grayscale indicia therein.

13. A method of producing an identification document, comprising:
providing a core including a top surface and a bottom surface; and
coating at least a portion of the top surface with a laser sensitive additives, the laser sensitive additive comprising:
an effective amount of at least one of one of copper potassium iodide ($CuKI_3$) or Copper Iodide (CuI); and
an effective amount of at least one of zinc sulfide (ZnS), barium sulfide (BaS), ( ), alkyl sulfonate, and thioester.

14. The method recited in 13 above further comprising laminating at least the top surface of the core with a laminate.

15. The method recited in 13 above further comprising directing a laser beam so that it passes through at least a portion of the coating and reaches the core layer to form a grayscale indicia on the core layer.

16 The method recited in 13 above of claim 2, wherein the core comprises at least one of TESLIN, polycarbonate, polyester, and polyvinyl chloride.

E. Third Aspect of the Invention.

In a third aspect of the invention, the invention utilizes the inventive laser enhancing laminate (or components thereof) in more than one layer on the identification document. Several embodiments of this aspect already have been presented above in the first and second aspects of the invention. Still another embodiment of this aspect is provided below.

Figure 8:
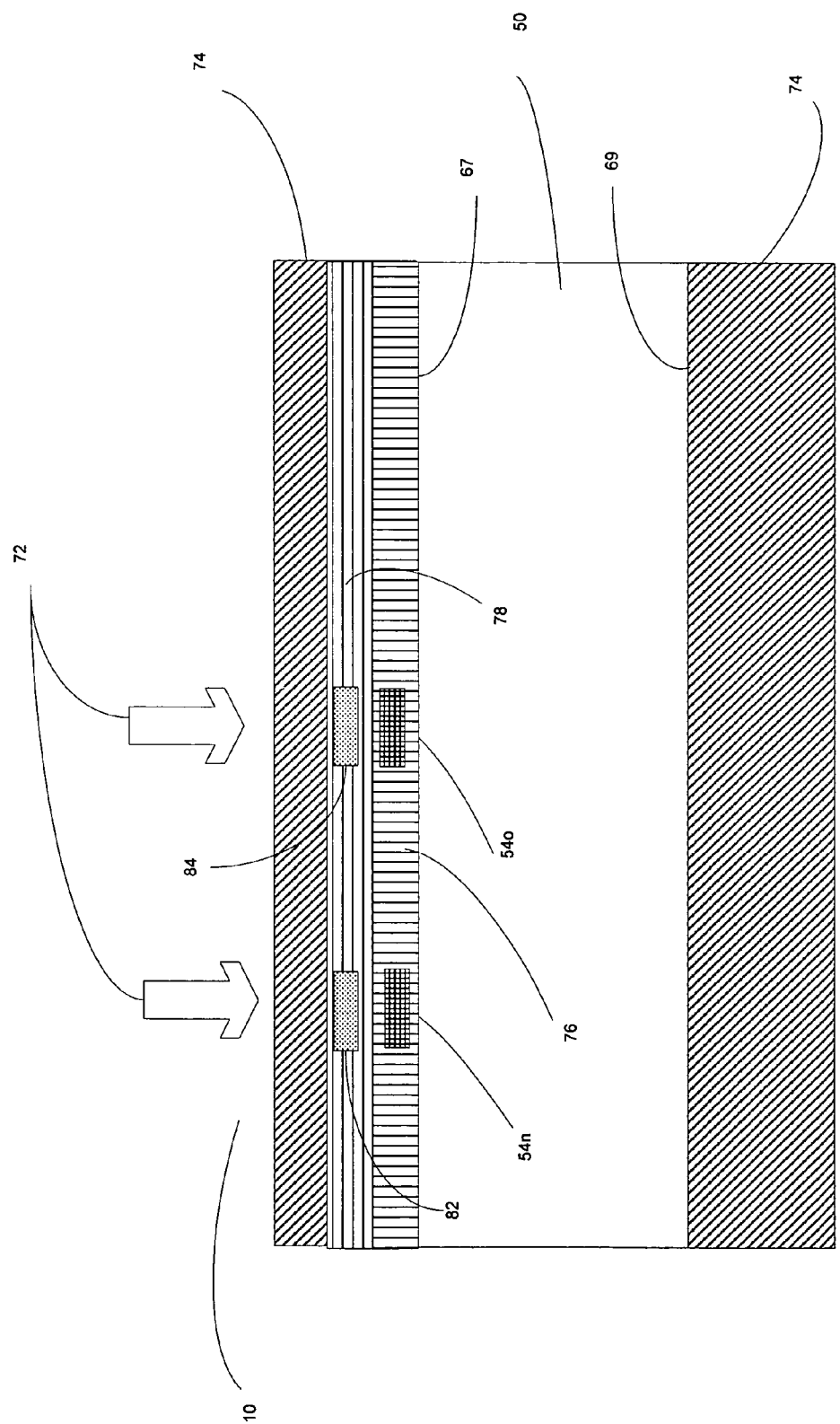
FIG. 8 is an illustrative cross sectional view of an identification document in accordance with a second embodiment of the second aspect of the invention.

FIG. 8 is an illustrative cross sectional view of an identification document in accordance with a second embodiment of the second aspect of the invention. In the embodiment of FIG. 8, the ID document 10 preferably includes a multi-layered structure, and the inventive laser enhancing additive is divided between two optically adjacent layers, as previously described. For purposes of illustration, however, the ID document 10 may have an front outward appearance generally similar to the identification document 10 of FIG. 1, although the construction and components of the cross-section shown in FIG. 8 differs from the prior art. In the embodiment of FIG. 8 a first portion of the inventive laser enhancing additive is disposed in a first coating 76 and a second portion of the inventive laser enhancing additive is disposed in a middle laminate 78 applied over the first coating 76. An overlaminate 74 is applied over the middle laminate 78. The first coating 76 is applied to the core layer 50, which in FIG. 8 is made from an opaque white material, such as TESLIN or polycarbonate.

In the embodiment of FIG. 8, the first coating 76 contains a first effective amount of at least one of copper potassium iodide ($CuKI_3$) or copper iodide (CuI) and the middle laminate 78 contains a second effective amount of at least one of the following: zinc sulfide (ZnS), barium sulfide (BaS), alkyl sulfonate and thioester. The first effective amount is greater than the second effective amount, in this embodiment. The first coating 76 and middle laminate 78 are constructed and arranged so that the laser radiation 72 can pass through both the first coating 76 and middle laminate 78 to form indicia 54n, 54o and latent indicia 82, 84 on the ID document 10. Although not apparent in the cross sectional view of FIG. 8, our testing has shown that the indicia 54l, 54m formed on the core layer 50 can be a usable grayscale image (by usable, it is at least meant that image can be used for security purposes, such as identification or authentication). As previously described, the latent indicia 82, 84 can comprise lighter or fainter (but still visible) version of the indicia 54n, 54o.

The latent indicia 82, 84 can be advantageous as a security feature because a counterfeiter may remove the middle laminate 78 in an attempt to alter information in the middle laminate 78, but the information will still be present on the core layer 50 that has the first coating 76. Similarly, a counterfeiter may attempt to remove then replace the middle laminate 78, in order to alter information on the core layer 78, but the latent indicia 82, 84 will still be present and visible in the middle laminate 78. As those skilled in the art will appreciate, the type and placement of an indicia is formed on the core layer 50 depends on the particular type of laser used the manner in which the laser is used (e.g., pumped), and the duration of the application of laser energy.

It should be understood that although the example of FIG. 8 shows that the first coating 76 contains the effective amount of at least one of copper potassium iodide ($CuKI_3$) or copper iodide (CuI) and the middle laminate 78 contains the effective amount of at least one of zinc sulfide (ZnS), barium sulfide (BaS), alkyl sulfonate and thioester, the positions of the two compounds in the respective first and second layers could be reversed. That is, the first coating 67 could contain the effective amount of at least one of zinc sulfide (ZnS), barium sulfide (BaS), alkyl sulfonate and thioester, and the second coating 78 could contain the effective amount of copper potassium iodide ($CuKI_3$) or copper iodide (CuI).

Concluding Remarks

Depending on the availability of lasers, identification documents manufactured in accordance with the invention can be produced in both over the counter and central issue environments. One example of a printing device that may be usable for at least some over the counter embodiments of the invention is the DATACARD DCL30 Desktop Card Laser Personalization System, available from Datacard Group of Minnetonka, Minn.

In one embodiment, following lamination and laser engraving, the ID document 10 is cooled and is cut (e.g., by die-cutting) to a predetermined size. In at least one embodiment, however, the substrate and laminate can be sized such that cutting the laminated printed substrate is not necessary.

The identification document 10 of the invention may be manufactured in any desired size. For example, identification documents can range in size from standard business card size (47.6.times.85.7 mm) up to identification booklet documents (127.times.177.8 mm), and can have thicknesses in the range of from about 0.3 to about 1.3 mm. At least some identification documents produced in accordance with embodiments of the invention conform to all the requirements of ISO 7810, 1985 and will thus be of the CR-80 size, 85.47-85.73 mm wide, 53.92-54.03 mm high and 0.69-0.84 mm thick. The corners of such CR-80 documents are rounded with a radius of 2.88-3.48 mm.

In addition, while the preferred embodiments have been described with reference to cyan, magenta and yellow dyes, the present invention is not so limited. The present invention can include addition color, alternative color schemes and even spot colors. Also, while the present invention has been described with reference to NIR, the inventive technique can be expanded to include dyes responsive in the ultra-violet spectrum and other IR ranges.

Further, while some of the examples above are disclosed with specific core components (e.g., TESLIN), we note that our inventive compositions, methods, articles, features, and processes can be applied to other core-based identification documents as well, including those documents manufactured from other materials. For example, where an embodiment has shown polycarbonate or polyester as an example over-laminate, those skilled in the art will appreciate that many other over laminate materials can be used as well.

Likewise, the inventive coatings described herein may be used to sensitize other core components as well. Also, we note that the coating can be applied to both a document core and to an over-laminate, and that the laser engraving can be preformed in both (or either) the core and over-laminate.

To provide a comprehensive disclosure without unduly lengthening the specification, applicants herein incorporate by reference each of the patent documents referenced previously, along with U.S. Pat. Nos. 6,022,905, 5,298,922, 5,294,774, 4,652,722, 5,824,715 and 5,633,119, and U.S. patent Ser. No. 09/747,735 (filed Dec. 22, 2000) and Ser. No. 09/969,200 (filed Oct. 2, 2001).

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in the following applications, the disclosures of, which are incorporated herein by reference: Ser. No. 09/747,735 (filed Dec. 22, 2000), Ser. No. 09/969,200 (filed Oct. 2, 2001). Also, instead of ID documents, the inventive techniques can be employed with product tags, product packaging, business cards, bags, charts, maps, labels, etc., etc., particularly those items including engraving of an over-laminate structure. The term ID document is broadly defined herein to include these tags, labels, packaging, cards, etc. In addition, while some of the examples above are disclosed with specific core components, it is noted that-laminates can be sensitized for use with other core components.

To provide a comprehensive disclosure without unduly lengthening the specification, applicant hereby incorporates by reference each of the patents and patent applications referenced above.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. An article of manufacture capable of being laser engraved with a grayscale indicium, the article comprising:
   a host material; and
   an effective amount of a laser enhancing additive material mixed into the host material, the laser enhancing additive comprising:
      a first laser enhancing additive including a first quantity of at least one of copper potassium iodide ($CuKI_3$) or Copper Iodide (CuI); and
      a second laser enhancing additive different from the first laser enhancing additive;
   wherein the laser enhancing additive material is present in an amount from about 0.001 to 0.2 percent by weight based on the total weight of the article; and wherein the article comprises a coating or laminate.

2. The article as recited in claim 1, wherein the laser enhancing additive material is present in an amount that is about 0.06 to 0.12 percent by weight based on the total weight of the article.

3. The article of claim 1 wherein the article comprises a coating.

4. The article of claim 1 comprising:
   a first layer comprising a first host material, the first host material comprising an effective amount of the first laser enhancing additive; and
   a second layer operably coupled to the first layer, the second layer comprising a second host material, the second layer oriented in relation to the first host material such that a single laser beam can penetrate both at least a portion of the first layer and at least a portion of the second layer, the second host material comprising an effective amount of the second laser enhancing additive.

5. The article of manufacture as recited in claim 4, further comprising a grayscale image laser engraved into at least one of the first and second layers.

6. The article of manufacture of claim 4 wherein the article comprises a laminate.

7. The article of manufacture as recited in claim 4, wherein the article of manufacture comprises at least a component of an identification document.

8. The article of manufacture of claim 4, further comprising a base layer having a first surface, wherein at least one of the first and second layers is operably coupled to the first surface of the base layer.

9. The article of manufacture of claim 4 wherein the base layer comprises a material that is not laser engraveable to form a grayscale indicium.

10. The article of manufacture of claim 4, wherein at least one of the first and second layers comprises a laminate.

11. The article of manufacture of claim 4, wherein at least one of the first and second layers comprises a coating.

12. The article of manufacture of claim 11, wherein the layer comprising a coating is applied to at least one secret location.

13. The article of claim 1 wherein the second laser enhancing additive comprises a metal sulfide.

14. The article of claim 13 wherein the metal sulfide comprises zinc sulfide.

15. The article of claim 13 wherein the metal sulfide comprises barium sulfide.

* * * * *